United States Patent
Ims et al.

(10) Patent No.: US 9,137,324 B2
(45) Date of Patent: Sep. 15, 2015

(54) CAPACITY ON-DEMAND IN DISTRIBUTED COMPUTING ENVIRONMENTS

(75) Inventors: Steven D. Ims, Apex, NC (US);
Yongcheng Li, Raleigh, NC (US);
Richard J. Lusardi, Ridgefield, CT (US); Jie Xing, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2921 days.

(21) Appl. No.: 10/119,820

(22) Filed: Apr. 10, 2002

(65) Prior Publication Data
US 2004/0049579 A1    Mar. 11, 2004

(51) Int. Cl.
*G06F 15/16* (2006.01)
*H04L 29/08* (2006.01)

(52) U.S. Cl.
CPC ........ *H04L 67/2819* (2013.01); *H04L 67/2823* (2013.01); *H04L 69/329* (2013.01); *H04L 67/2842* (2013.01)

(58) Field of Classification Search
CPC .................................................. H04L 67/2823
USPC .................. 709/225, 235, 217–219; 717/177; 718/105
See application file for complete search history.

(56) References Cited

U.S. PATENT DOCUMENTS

| | | | |
|---|---|---|---|
| 5,341,477 A * | 8/1994 | Pitkin et al. | 709/226 |
| 5,867,706 A * | 2/1999 | Martin et al. | 718/105 |
| 6,112,239 A * | 8/2000 | Kenner et al. | 709/224 |
| 6,178,160 B1 * | 1/2001 | Bolton et al. | 370/255 |
| 6,185,598 B1 * | 2/2001 | Farber et al. | 709/200 |
| 6,243,761 B1 * | 6/2001 | Mogul et al. | 709/246 |
| 6,256,675 B1 * | 7/2001 | Rabinovich | 709/241 |
| 6,553,413 B1 * | 4/2003 | Leighton et al. | 709/219 |
| 6,654,807 B2 * | 11/2003 | Farber et al. | 709/225 |
| 6,785,704 B1 * | 8/2004 | McCanne | 718/105 |
| 6,785,707 B2 * | 8/2004 | Teeple | 709/203 |
| 6,799,214 B1 * | 9/2004 | Li | 709/226 |
| 6,820,133 B1 * | 11/2004 | Grove et al. | 709/238 |
| 6,865,593 B1 * | 3/2005 | Reshef et al. | 709/203 |
| 7,099,915 B1 * | 8/2006 | Tenereillo et al. | 709/203 |
| 7,099,933 B1 * | 8/2006 | Wallace et al. | 709/223 |
| 7,191,242 B1 * | 3/2007 | Serenyi et al. | 709/231 |
| 7,406,498 B2 * | 7/2008 | Reshef et al. | 709/203 |
| 7,631,102 B2 * | 12/2009 | Bodwell et al. | 709/246 |
| 8,281,035 B2 * | 10/2012 | Farber et al. | 709/245 |
| 2001/0016873 A1 * | 8/2001 | Ohkado et al. | 709/205 |

(Continued)

*Primary Examiner* — Douglas Blair
(74) *Attorney, Agent, or Firm* — Steven L. Nichols; Van Cott, Bagley, Cornwall & McCarthy P.C.

(57) ABSTRACT

Methods, systems, computer program products, and methods of doing business by using dynamic capacity-on-demand techniques for re-routing traffic in a distributed computing network. When demand on an enterprise's resources exceeds some predetermined level, dynamic modifications cause static content (such as images) to be served from resources which are external to the enterprise, such as a caching system which is located close to the enterprise's end users. When demand falls below the predetermined level, the modifications are effectively reversed, such that the external resources are no longer used. The predetermined level may apply to a single monitored device, or to a group of monitored devices. The dynamic capacity-on-demand techniques may also be used for dynamic types of content, such as for dynamically re-routing access to an application program executing on an external resource, and may be used for internal capacity-on-demand as well.

46 Claims, 18 Drawing Sheets

(56) References Cited

U.S. PATENT DOCUMENTS

| | | | |
|---|---|---|---|
| 2002/0002625 A1* | 1/2002 | Vange et al. | 709/246 |
| 2002/0038367 A1* | 3/2002 | Inoue | 709/225 |
| 2002/0083265 A1* | 6/2002 | Brough et al. | 711/118 |
| 2002/0120577 A1* | 8/2002 | Hans et al. | 705/59 |
| 2002/0147634 A1* | 10/2002 | Jacoby et al. | 705/14 |
| 2002/0156911 A1* | 10/2002 | Croman et al. | 709/235 |
| 2002/0166117 A1* | 11/2002 | Abrams et al. | 717/177 |
| 2002/0178254 A1* | 11/2002 | Brittenham et al. | 709/224 |
| 2002/0194335 A1* | 12/2002 | Maynard | 709/225 |
| 2002/0194382 A1* | 12/2002 | Kausik et al. | 709/246 |
| 2003/0033434 A1* | 2/2003 | Kavacheri et al. | 709/246 |
| 2005/0021862 A1* | 1/2005 | Schroeder et al. | 709/246 |
| 2005/0256955 A1* | 11/2005 | Bodwell et al. | 709/224 |
| 2007/0073845 A1* | 3/2007 | Reisman | 709/219 |
| 2008/0140838 A1* | 6/2008 | Inoue | 709/225 |
| 2010/0161762 A1* | 6/2010 | Saxena | 709/219 |

* cited by examiner

100

```
<html>
<head> .... </head>
<body>
...    /—110      120            130
<img src="http://www.abcdef.xxx/examples/images/customer_care.gif">
...
</body>
<html>
```

150

```
<html>
<head> .... </head>
<body>

...    /—160    170    180         190
<img src="http://www.cdsp.xxx/abcdef/examples/images/customer_care.gif">
...

</body>
<html>
```

FIG. 7
|  | Focus | Metric Example | Configurable Thresholds |
|---|---|---|---|
| Deployment 1 | Caching proxies | Active connections as measured in individual caching proxies | Intermediate and peak thresholds |
| Deployment 2 | Content servers | Aggregate bandwidth or active connections across a server set | Load balancing policy |
FIG. 8A
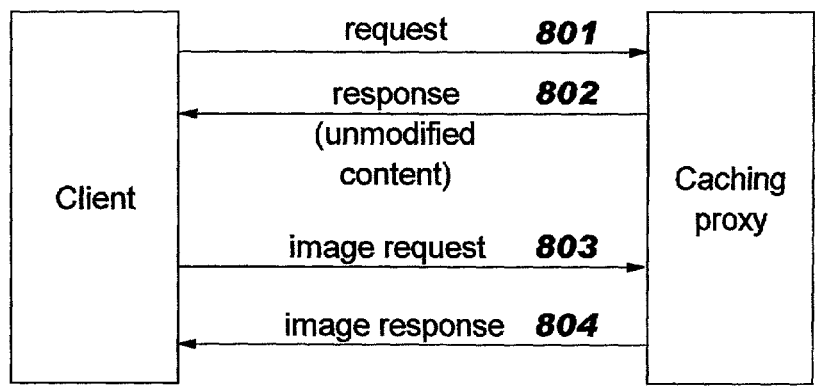
FIG. 8B
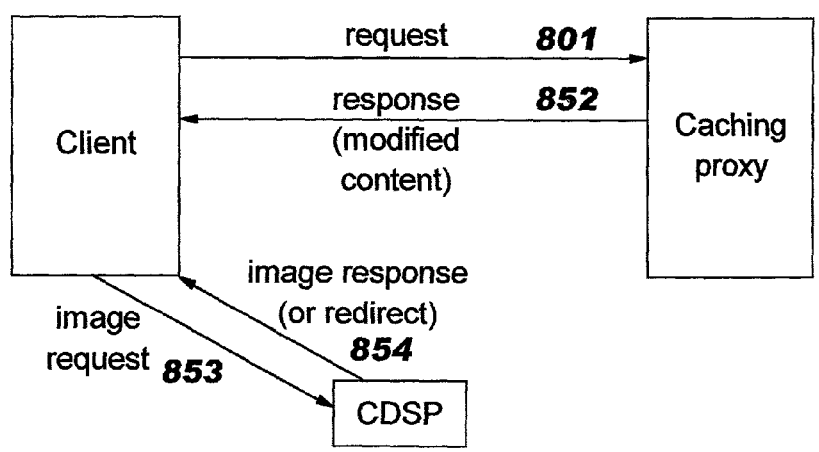

FIG. 9

```
<?xml encoding="ISO-8859-1"?>

<!ELEMENT config (locatePatterns*,mapPatterns*,replacePatterns*,pageGroups*)*>
<!ELEMENT locatePatterns (locatedURLAttributeRewrite*,locatedTagReplaceWithAltText*)*>
<!ELEMENT mapPatterns (urlMap*)* >
<!ELEMENT replacePatterns (urlReplace*)* >
<!ELEMENT pageGroups (pageGroup*)* >
<!ELEMENT pageGroup (pattern*, (rewrite|replace)*)* >
<!ELEMENT locatedURLAttributeRewrite EMPTY>
<!ELEMENT locatedTagReplaceWithAltText EMPTY>
<!ELEMENT urlMap EMPTY>
<!ELEMENT urlReplace EMPTY>
<!ELEMENT rewrite EMPTY>
<!ELEMENT replace EMPTY>
<!ELEMENT pattern EMPTY>
<!ATTLIST locatedURLAttributeRewrite
        name CDATA #REQUIRED
        src  CDATA #REQUIRED
        caseSensitive CDATA #REQUIRED>
<!ATTLIST locatedTagReplaceWithAltText
        name CDATA #REQUIRED
        src  CDATA #REQUIRED
        alt  CDATA #IMPLIED
        caseSensitive CDATA #REQUIRED>
<!ATTLIST urlMap
        name CDATA #REQUIRED
        from CDATA #REQUIRED
        to   CDATA #REQUIRED>
<!ATTLIST urlReplace
        name CDATA #REQUIRED
        select CDATA #REQUIRED>
<!ATTLIST pattern
        name CDATA #REQUIRED
        filterURL CDATA #REQUIRED>
<!ATTLIST rewrite
        locatePattern CDATA #REQUIRED
        mapPattern CDATA #REQUIRED>
<!ATTLIST replace
        locatePattern CDATA #REQUIRED
        replacePattern CDATA #REQUIRED>
```

FIG. 10A

```
1000
<?xml version="1.0" ?>
<!DOCTYPE config SYSTEM "configure.dtd">
<config>
  <pageGroups>
    <pageGroup>
      <pattern filterURL="http://w3.ibm.com/*" /> 1010
      <rewrite locatePattern="image" mapPattern = "map" /> 1020
    </pageGroup>
  </pageGroups>
  <locatePatterns>
                                    1030        1040          1050
    <locatedURLAttributeRewrite name="image" src="[img| ]src" caseSensitive ="false" />
  </locatePatterns>
  <mapPatterns>     1060   1070       1080
    <urlMap name="map" from="*" to="http://www.cdsp.xxx/ibm.com/*" />
  </mapPatterns>
</config>
```

FIG. 10B

```
<html><body>    1090
<img src=/image/logo.gif>
</body></html>
```

FIG. 10C

```
<html><body>              1095
<img src=http://www.cdsp.xxx/ibm.com/image/logo.gif>
</body></html>
```

FIG. 11

Rule 1:
If Nbr_Active_Connections (Site = www.mysite.xxx, Port = 80) > Max_Active_Connections
    Then
        Direct_To cachingProxy Rule 2:
If Bandwidth (Site = www.mysite.xxx, Port = 80) > Max_Bandwidth
    Then
        Direct_To cachingProxy Rule 3:
If Nbr_Active_Connections (Site = www.mysite.xxx, Port = 80) <= Min_Active_Connections
    Then
        Direct_To contentServer1 and contentServer2

Rule 4:
If Bandwidth (Site = www.mysite.xxx, Port = 80) <= Min_Bandwidth
    Then
        Direct_To contentServer1 and contentServer2

FIG. 13

| | Parameter Name | Type | Description |
|---|---|---|---|
| 1310 | INTERMEDIATE THRESHOLD | Integer | Boundary between nominal and intermediate modes. |
| 1320 | PEAK-THRESHOLD | Integer | Boundary between intermediate and peak modes. |
| 1330 | MINIMUM_MSEC_IN_MODE | Integer | Duration over which metrics are considered for mode determination (measured in milliseconds) |
| 1340 | CONVERT_NONCACHEABLE_CONTENT | 0 = false 1 = true | Flag to indicate whether non-cacheable content is modified on-the-fly by the CDSP plug-in. |
| 1350 | USAGE_COUNT_THRESHOLD | Integer | Specifies the minimum "popularity" of cached content before it is modified and cached as a variant of the original. The value represents the minimum number of times cached content has been served. |
| 1360 | MAX_AGE | Integer | Specifies the time-to-live (in seconds) applied to all modified content served during peak mode. This provides a measure of control over outbound caches, thus setting an upper bound on the duration of unnecessary usage of the CDSP's services. |
| 1370 | VARIANT_FILE_NAME | String | Temporary file used to save modified content as a variant. |

FIG. 15

```
void * HTTPD_LINKAGE Topen (unsigned char *handle, long *retc)
{
   unsigned long n = 0;
   long rc = 0;

evaluateConditions(handle, convert, doneConvert, &rc);

if(rc == HTTP_NOACTION) {
      *retc = HTTP_NOACTION;
   } else {
      HTTPD_open(handle, retc);
      *retc = HTTP_OK;
   } return(NULL);
}
```

FIG. 16

```
void evaluateConditions
            (void *handle,
               void (*convert)(CallbackParms *crParms,
                        long *returnCode),
               void (*doneConvert)(CallbackParms *crParms),
               long *return_code);
```

FIG. 17

```
typedef struct CallbackParms{ unsigned long structVersion;  /* o; version */ char *reqUrl;  /* i; requested url */
    unsigned long reqUrlLen; /* i;  length of requested url */ char *reqMethod; /* i; requested method */
    unsigned long reqMethodLen; /* i; requested method length */ char *reqProtocol; /* i; requested protocol */
    unsigned long reqProtocolLen; /* i; requested protocol length */ char *reqHeaderBuf; /* i; requested header */
    unsigned long reqHeaderBufLen; /* i; length of requested header */ char *resHeaderBuf;   /* i/o; response header */
    unsigned long resHeaderBufLen; /* i/o; response header length */ char *dataBuf;    /* i; response content */
    unsigned long dataBufLen; /* i; length of response content */ char *modDataBuf;    /* o; modified content */
    unsigned long modDataBufLen; /* o; modified content length */

}CallbackParms;
```

FIG. 18

```
void convert(CallbackParms *cbParms, long *returnCode) {
    cbParms->modDataBuf = (char *)malloc(cbParms->dataBufLen);
    strcpy(cbParms->modDataBuf,cbParms->dataBuf);
    cbParms->modDataBufLen = cbParms->dataBufLen;

// Return code: 0 = success; 1 = failure.
    *returnCode = 0;
}
```

FIG. 19

```
void doneConvert(CallbackParms *cbParms) {
    free(cbParms->modDataBuf);
}
```

CAPACITY ON-DEMAND IN DISTRIBUTED COMPUTING ENVIRONMENTS

BACKGROUND OF THE INVENTION

1. Field of the Invention

The present invention relates to a computer system, and deals more particularly with methods, systems, computer program products, and methods of doing business by using dynamic capacity-on-demand techniques for re-routing traffic in a distributed computing network.

2. Description of the Related Art

A goal of eBusiness is to maximize an enterprise's Return-On-Investment, or "ROI". Simply building an eBusiness infrastructure does not guarantee success in the eBusiness world. A key to success is for the enterprise to effectively and efficiently utilize all of the resouces it invests for eBusiness.

Many enterprises have spent large amounts of money on hardware, software, and services in order to conduct eBusiness. Many studies have found out that Internet traffic, such as eBusiness traffic, is bursty in nature. The bursty nature makes it difficult to determine an optimum deployment of resources, where this optimum deployment ensures that (1) the deployed resources are able to satisfy the demand, and (2) the deployed resouces are fully utilized. Providing this optimum deployment is key to maximizing an enterprise's ROI: under-investment in eBusiness infrastructure could turn customers away to competitors, while on the other hand, having idle resources is a waste of investment.

One solution to this resource deployment problem is to utilize outside resources to run eBusiness applications, such as using an application hosting service or application service provider. Typically, in these types of third party arrangements, the third party manages the resources and the customer's responsibility is limited to paying a monthly fee. However, this solution has several problems. First, it does not help those enterprises which have already invested in eBusiness infrastructure (which is most existing enterprises). Second, enterprises may have concerns about relying on an application hosting service or application service provider (such as concerns regarding the third party's security, customization, and/or personalization capabilities). Third, even though some enterprises like the model of using an application hosting service or application service provider, they might still want to own their core application support resources.

Accordingly, what is needed is a way to improve ROI for an enterprise's eBusiness infrastructure by achieving higher resource utilization while still handling occasional bursts of traffic.

SUMMARY OF THE INVENTION

An object of the present invention is to provide techniques for dynamically achieving capacity-on-demand in a distributed computing network.

A further object of the present invention is to provide this capacity-on-demand through use of outside computing resources.

Still another object of the present invention is to enable enterprises to achieve a better ROI for their eBusiness resources.

An additional object of the present invention is to provide in-house capacity-on-demand to improve an enterprise's ROI.

Another object of the present invention to provide new techniques for conducting eBusiness.

A further object of the present invention is to enable content distribution service providers to service clients in a dynamic, on-demand operating mode.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for using dynamic capacity-on-demand techniques for re-routing traffic in a distributed computing network. In preferred embodiments, this technique comprises: comparing current workload conditions, at a system which receives a content request, to one or more threshold values to determine a current operational mode of the receiving system; and serving a modified version of the requested content, or an unmodified version of the requested content, depending on the current operational mode, wherein: the modified version is programmatically created from the unmodified version by rewriting selected ones of one or more embedded content references within the unmodified version; and the rewritten content references refer to resources which are external to an enterprise in which the receiving system is located, such that subsequent requests for each of the embedded content references are automatically directed to the external resources; and the embedded content references in the unmodified version refer to local resources of the enterprise, such that subsequent requests for each of the embedded content references are automatically directed to the local resources.

The programmatic creation of the modified version may further comprise replacing one or more selected ones of the embedded content references within the unmodified version, such that the replaced content references no longer refer to resources.

In a first aspect, the receiving system is a caching proxy, and the current workload conditions pertain to the caching proxy. In a second aspect, the receiving system is a load balancer, and the current workload conditions pertain to one or more devices for which the load balancer balances workload.

The threshold values preferably include a peak mode threshold, and the serving operation preferably serves the modified version when the current operational mode is a peak mode that reflects exceeding the peak mode threshold. The threshold values may also include an intermediate mode threshold, and the serving operation preferably serves the unmodified version when the current operational mode is an intermediate mode that reflects exceeding the intermediate mode threshold but not the peak mode threshold. In this case, the technique preferably further comprises creating modified versions of content when the current operational mode is the intermediate mode.

Optionally, the serving operation serves the modified version during the peak mode only if the peak mode threshold is exceeded when the request for the content is received.

In a second aspect, the threshold values are preferably specified as load balancing policy, and one or more caching proxies are activated to perform the serving operation when the modified versions of the requested content are to be served.

The technique preferably further comprises caching the modified version as a cache variant of the unmodified version. The technique preferably also further comprises storing a copy of content referenced by the embedded content references on the external resources, and using the externally-stored copy to serve the subsequent requests.

The modified versions are preferably created according to rules specifying which embedded content references are subject to modification and how those embedded content references should be modified. These rules are preferably specified using a structured markup language.

The present invention may be used for offloading applications, whereby current workload conditions are monitored to determine when it would be advantageous for re-routing requests for application processing.

As an alternative to using the present invention for redirecting content requests to external resources, the disclosed techniques may be used for redirecting requests to shared resources which are internal to an enterprise.

The present invention may also be used advantageously in methods of doing business. For example, a content distribution service provider may offer its clients the opportunity to subscribe to a pay-per-use billing plan based on the dynamic capacity-on-demand techniques disclosed herein.

In this aspect, the present invention may be embodied as a technique for hosting content for an enterprise, comprising: providing storage resources for use by the enterprise; receiving notification that a current workload of the enterprise has crossed a threshold after which the content hosting is desired; determining a local storage location on the provided storage resources for storing, at least temporarily, copies of each of one or more selected resources of the enterprise; storing the copies of the one or more-selected resources in the determined local storage locations; programmatically modifying content of the enterprise to refer to selected ones of the determined local storage locations, such that subsequent requests for content references which are embedded in the programmatically modified content will be automatically diverted from the enterprise to the content host; and serving the copies of particular ones of the one or more selected resources from the determined local storage resources, responsive to receiving the subsequent diverted requests for the particular ones.

This aspect may further comprise charging the enterprise for use of the provided storage resources, charging the enterprise for serving the copies from the determined local storage resources, and/or-charging the enterprise for storing the copies of the one or more selected resources.

The techniques disclosed herein may also be used in methods of doing business for other types of constrained resources of the enterprise. As one example, methods of doing business may be provided by supporting execution of dynamically "edgified" or "edgeable" applications.

The present invention will now be described with reference to the following drawings, in which like reference numbers denote the same element throughout.

BRIEF DESCRIPTION OF THE DRAWINGS

FIG. 7 provides a summary of the two deployment strategies in FIGS. 5 and 6;

FIGS. 8A and 8B illustrate the flow of messages for the deployment strategy of FIG. 5 when operating in nominal and peak modes, respectively;

FIG. 9 provides a sample document type definition ("DTD") that may be used to define the allowable syntax for content modification rules;

FIG. 10A depicts a sample Extensible Markup Language ("XML") document in which content modification rules are provided for use by content modification code, and FIGS. 10B and 10C provide an example showing application of these sample rules;

FIG. 11 provides an example of how load balancing policy might be specified using a collection of rules, for use in the deployment scenario of FIG. 6;

FIG. 13 provides a table showing variables that may be used in an implementation of the present invention;

FIGS. 15-19 provide samples of code and data structures that may be used by preferred embodiments of the present invention;

DESCRIPTION OF PREFERRED EMBODIMENTS

Figures 1A, 1B, 2:
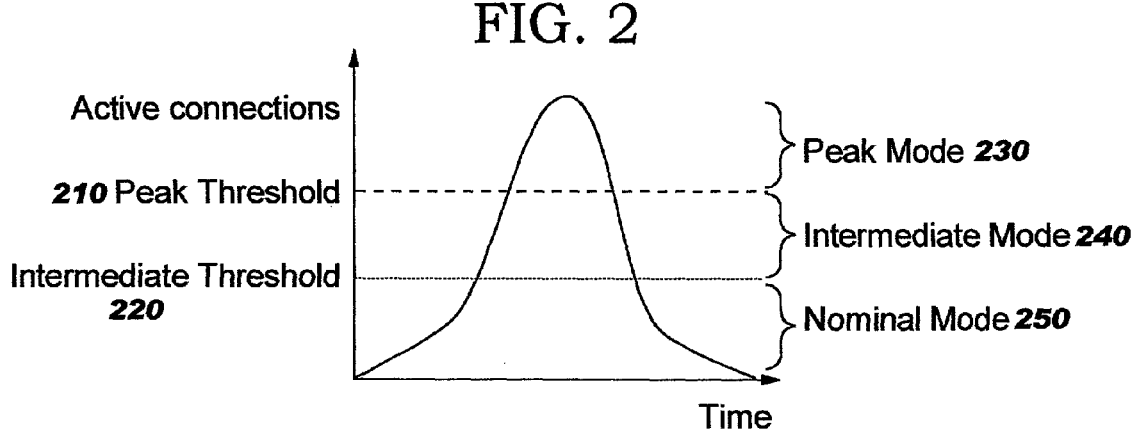
FIGS. 1A and 1B provide a sample Web page for use in illustrating one measure of content modification performed by the present invention.
FIG. 2 shows a graph of active connections over time, illustrating demand on an enterprise's computing resources.

The techniques disclosed by the present invention provide a new way of conducting eBusiness, and enable enterprises to focus their eBusiness resource deployment on meeting base-level demand When demand exceeds the capacity of the enterprise's deployed resources, outside resources will automatically be utilized to handle some of the demand. The outside resources may be provided, for example, as Edge Services or by Content Distribution Service Providers ("CDSPs"). The techniques of the present invention are directed toward ensuring that an enterprise's deployed resources are not under-utilized, while still being able to satisfy higher resource demands (such as temporary bursty traffic). When a predetermined demand level is reached, the disclosed techniques cause the system to respond by directing resource requests to a third party (which may, for example, charge a per-usage fee). The disclosed techniques thereby provide an enterprise with "capacity-on-demand".

As will be described, the techniques disclosed herein also address in-house capacity-on-demand, where an enterprise's internal resources (such as an enterprise-wide set of shared caches) may be dynamically leveraged during times of peak demand. For ease of reference, the discussions herein are primarily in terms of external resources. The internal technique is then discussed with reference to FIG. 21.

The disclosed techniques benefit the end user by providing consistent response time, even during peak demands. They also benefit the eBusiness enterprise, which can adequately serve its customers during peak demands without having to pay for unused idle resources in times of lower demand. The disclosed techniques also provide an additional channel of revenue for external enterprises providing the on-demand resource service. Hereinafter, the third party enterprises which provide the on-demand resource service are referred to as CDSPs. (However, other types of third parties might alternatively provide such services, and therefore the term "CDSP" is used by way of illustration and not of limitation.)

As is known in the art, CDSPs provide a valuable service by allowing their clients to access their broad network infrastructure for caching a client's static content in close proximity to the client's end users. However, in existing business models, a CDSP's clients subscribe to the CDSP's service in an "always on" basis. This approach may be overly expensive for enterprises whose own deployed resources are capable of serving their base level demand. Using the capacity-on-demand techniques of the present invention, an eBusiness enterprise can take advantage of the CDSP's service only when needed, thereby lowering the expense the enterprise incurs. By virtue of this affordability, the CDSP, on the other hand, can increase its revenue by attracting more clients.

An eBusiness enterprise that makes beneficial use of the present invention may build its eBusiness infrastructure and deploy applications anew, or an enterprise may already have eBusiness resources in place with applications already running. In either case, the enterprise's deployed resources should be sufficient to handle traffic at a base level demand. The enterprise will then use outside resources when its own capacity is exceeded, according to the capacity-on-demand techniques disclosed herein.

In preferred embodiments of the present invention, the outside resources are configured to provide services for the enterprise's end users. (The configuration may be done off-line or at run-time.) Preferably, a load monitor and redirector function is deployed at the network edge, between the enterprise and its users. If the load monitor detects that demand has exceeded a predefined level, such that the enterprise's own resources may be inadequate to provide acceptable response time to the users, requests will begin to be redirected to the pre-configured outside resources. Subsequently, when the demand decreases back to the level where the enterprise's resources are sufficient, then in preferred embodiments, all requests are dynamically directed back to the enterprise (where they will be serviced using the enterprise's own resources).

The manner in which preferred embodiments of the present invention operate will now be described with reference to FIGS. 1-21.

According to preferred embodiments, content such as HyperText Markup Language ("HTML") Web pages is modified dynamically to leverage the resources of a CDSP. The term "modified content" is used herein to refer to such content modifications. An example will now be described with reference to FIGS. 1A and 1B, which illustrate a sample (skeleton) HTML page before and after modification. In FIG. 1A, the Web page in HTML document 100 is depicted as having an embedded reference 110 to an image file. Upon receiving this HTML document 100, the user's browser will automatically issue a request for the image file, using the source address specified in the following Uniform Resource Locator ("URL"):

http://www.abcdef.xxx/example/images/customer_care.gif

Presumably, this URL refers to a storage location on the enterprise's own resources (and for this example, some type of customer care image is stored at this location). The Web page in HTML document 150 of FIG. 1B represents the same content as the Web page in document 100, where the embedded reference 110 has been programmatically replaced by a modified reference 160. The URL of the modified reference 160 is depicted as http://www.cdsp.xxx/abcdef/example/images/customer_care.gif and is intended to represent a location on a CDSP's resources from which a copy of the same customer care image can be retrieved. Thus, upon receiving Web page 150, the browser will automatically issue a request for the image to the CDSP's resource instead of to the enterprise's own resource, thereby reducing some of the processing load on the enterprise's resources.

Images are considered "static" content, and are an example of the types of references that may be modified by an implementation of the present invention. In addition to ".gif" images, several other types of image files are well known, such as ".bmp" and ".jpeg", and these types of images are preferably treated in an analogous manner. Often, image files are relatively large, and thus serving such files from a CDSP can free up the enterprise's own resources for handling other requests. While preferred embodiments are described primarily with reference to image files, the dynamic modification techniques disclosed herein may be used with other types of static content as well, including (but not limited to) sound files, streaming audio, streaming video, and various other types of multi-media content. Furthermore, in alternative embodiments, the disclosed techniques may be used with dynamic content. These alternative embodiments will be described below.

Preferably, embodiments of the present invention serve modified content only during periods of "peak" workload, where workload is measured by one or more user-selectable metrics. Examples of metrics that may be used for this purpose include the number of active connections, the total number of connections, and effective bandwidth. The disclosed techniques may also be used in a system that monitors workload using other types of metrics such as CPU usage. FIG. 2 shows a graph where the metric is active connections, and shows how the number of active connections may increase and then decrease over time. In preferred embodiments, three different operational modes are defined. These modes are referred to herein as nominal mode, intermediate mode, and peak mode. (In alternative embodiments, the intermediate mode can be omitted. However, advantages may be realized by including this intermediate mode, as will be described in more detail below.)

Nominal mode refers to lightly-loaded conditions. It is presumed that the enterprise has deployed sufficient resources to handle demand during nominal mode, and thus during nominal mode, unmodified Web content is served. With reference to the example in FIGS. 1A and 1B, the original Web page in HTML document 100 would be served to a requester, causing the customer care image to be retrieved and returned to the browser from the enterprise's own resources.

Peak mode refers to heavily-loaded conditions. In preferred embodiments, an implementation of the present invention will serve modified content (such as modified HTML pages) during peak mode. Thus, for the example in FIGS. 1A and 1B, the modified Web page in HTML document 150 would be served to a requester during peak mode, and the user's browser would therefore automatically retrieve the customer care image from the CDSP's resources. (An optional pacing technique may be implemented, whereby original content may be served during peak mode if workload temporarily drops below the peak threshold. This pacing technique is described in more detail below.)

Intermediate mode is an optional mode during which original Web content (e.g. Web page 100 of FIG. 1A) is served, but a modified version of the content (e.g. Web page 150 of FIG. 1B) is created and the content referenced by the modifications is preferably sent to the CDSP for caching. (With reference to FIG. 1B, for example, a copy of the referenced image would be sent to the CDSP for caching during intermediate mode.) Preferably, this processing occurs as part of a background process. The goal of using this mode is to prepare the system for possible peak workload before workload actually reaches peak levels. In essence, this mode represents a trade-off between resource utilization (during nominal mode) and responsiveness (during peak mode). It should be noted that URL rewriting is not yet reflected in the pages being returned to the browser when operations are in intermediate mode: instead, the enterprise's resources continue to supply requested (and embedded) content to users, and the content modifications are not used until peak mode occurs. Once the threshold for peak mode has been crossed, the CDSP can immediately begin serving content which has been prepared and cached during intermediate mode.

If the pre-fetching and caching operations of the intermediate mode are not used, on the other hand, then the modification process will be performed in real time, which is relatively expensive in terms of resource consumption and response time delay. Furthermore, requests sent by a browser to the CDSP when the browser processes a modified URL will initially result in a "cache miss". (That is, the requested content will not be found in the CDSP's cache.) When this happens, the requested content must be retrieved from the origin server, resulting in at least a slight delay in delivering the content to the requester. This delay can be avoided if the content has already been retrieved and cached at the CDSP.

As an optimization of the content modification processing, only "popular" content is modified and cached. Preferably, the user controls which content is deemed to be popular. For example, a metric might be specified, such as setting a threshold on the number of content requests per minute. By performing the content modification processing only for popular content, processing efficiencies can typically be realized.

In alternative embodiments, the techniques of the present invention may also (or alternatively) be used to trigger dynamic application distribution, whereby applications can be moved to an alternative location to relieve processing demand on an enterprise's resources. (For example, so-called "edgeable" applications might be moved to the edge of the network.) The application will then execute from its new location. In this manner, dynamic content can be served using the techniques of the present invention. When used for application offloading, the techniques of the present invention can improve response time and reduce both the network and back-end server load. Typically, an enterprise will prefer to use its own facilities to serve its customers when the demand is within its capacity, in order to increase ROI. This applies to dynamic content generation achieved by application offloading, as well as to serving static content through URL rewriting. According to the techniques disclosed herein, only when the demand exceeds the enterprise's capacity will the requests be directed to external CDSP resources or applications which are dynamically moved to edge servers.

Note that the manner in which an application offload is performed does not form part of the inventive concepts of the present invention, and prior art techniques are preferably used to perform the actual distribution of the applications. See, for example, commonly-assigned U.S. patent application Ser. No. 09/864,663 (now abandoned), filed May 23, 2001, which is titled "Dynamic Deployment of Services in a Computing Network". This patent describes techniques with which edge server technology allows bringing dynamic aspects of application programs to the edge of the network, and discloses techniques for dynamically moving business logic to the network edge. Once an application has moved to another location, the dynamic content modification techniques of the present invention can be used to transparently redirect traffic to the application's new location, whereby web page links to edgeable applications are rewritten to point to the new location. Furthermore, the capacity-on-demand techniques disclosed herein may be used without rewriting content, whereby workload is monitored and a device such as a router is notified to begin redirecting requests to a different location upon reaching a peak mode threshold.

The concepts of nominal, intermediate, and peak modes apply in an analogous manner to the caching proxy in embodiments in which content modification to access dynamically-deployed applications is performed (and intermediate mode is optional in the caching proxy used in these embodiments as well).

Referring again to FIG. 2, the profile of active connections over time illustrates a system progressing from nominal to peak mode and back again. During nominal and intermediate modes (see elements 250 and 240), content is served from the enterprise's own resources, and during peak mode (see element 230), the CDSP's resources are used, as described above. It is important to note that the enterprise site regains processing of all requests after the peak workload subsides.

In addition to selecting the metric(s) that measure workload, the user configures a threshold value that represents crossing from one mode to another. (The "user" for this purpose is preferably someone such as a systems administrator of the enterprise implementing the capacity-on-demand solution. It should be noted, however, that it is not necessary that a human being specify the threshold values. Alternatively, the values to be used might be programmatically supplied, for example as a result of performing an automated analysis of the enterprise's traffic patterns. References herein to a user selecting metrics and threshold values are therefore by way of illustration, and are intended to include other ways of obtaining such information.) When all three operational modes are in use, the user specifies two threshold values to indicate the boundaries between the modes. FIG. 2 depicts these boundaries as being a peak threshold 210 and an intermediate threshold 220. Preferably, a configuration interface is used whereby the user can provide the values for the thresholds. For example, a graphical user interface ("GUI") might be displayed to a human user, and values for the thresholds can then be obtained from this GUI. Or, values might be written to a configuration file. Use of the configuration interface provides a flexible way to tune the values used in operation of the present invention (for example, in response to changes in the number of deployed resources and/or statistics gathered from using the capacity-on-demand techniques of the present invention, etc.).

In an illustrative embodiment, the present invention may be implemented using a framework of basic services into which content-modifying code may be integrated. The basic services of the framework include "mode detection", whereby information about current demand levels is used to determine which of the operational modes is appropriate, and "background conversion/caching". A commercially-available system on which this framework may be provided is exemplified by the WebSphere® Edge Server ("WSES") product from the International Business Machines Corporation ("IBM"). ("WebSphere" is a registered trademark of IBM.) The WSES content caching component enables serving many requests from content that has been cached at one or more caching proxies, thus allowing an enterprise's content servers to be better leveraged for specialized processing. (That is, by making use of caching to serve content where possible, the content servers have greater capacity for handling specialized request processing.) The WSES load balancing component ensures system availability by dynamically spreading the processing demand among multiple content servers and/or caching proxies.

The mode detection and background processing (i.e. the background conversion/caching) techniques of the present invention may operate as one or more plug-ins or filters in the network path between the content caching proxies and content servers. Use of plug-ins is a technique which is generally known in the art for adding functionality to an existing device without modifying the device itself. (Use of plug-ins for the purposes disclosed herein is not known in the art, however.) In this manner, a configurable interface to the CDSP's resources can be provided, whereby the CDSP's resources are only used when the user-configured parameters are met. Alternatively, rather than using plug-ins, the implementation of a system may be directly modified to include the techniques disclosed herein. (Implementations of the present invention are discussed herein with reference to logic that operates using a plug-in model; it will be obvious to one of ordinary skill in the art how this logic may be modified for alternative implementation strategies.)

In the illustrative embodiment, the content-modifying code is provided as a WSES caching proxy "transmogrifier" plug-in, as well as a callback function that invokes the background processing of the framework. "Transmogrifier" refers to customized code that performs some type of modification. In the WSES environment, a transmogrifying plug-in can be invoked to modify a response. Originally, content (such as the Web page in FIG. 1A) is authored to leverage the enterprise's own resources, and links within that content are then rewritten by the transmogrifier function upon detecting peak mode conditions, as discussed earlier.

Note that while content modification is discussed herein primarily in terms of replacing one URL with another URL, there may be situations in which it is preferable to remove selected links altogether, perhaps for performance reasons. For example, a link to a streaming video file might be replaced with a displayable text message indicating that the file content is being omitted. This type of non-URL-based replacement is also within the scope of the present invention. Furthermore, it should be noted that the modifications to a particular document may include rewriting one or more URLs, replacing one or more URLs, or performing a combination of rewriting and replacing URLs. (Modifications may also be performed for other types of links which are analogous to URLs.)

The content modification code may be implemented by the enterprise itself, for example as an extension of its own caching proxies. In preferred embodiments, however, the code performing the modification may be provided by the CDSP (for example, as a content-modifying 1 agent routine). In this latter case, content which is to be modified (such as the HTML code in document 100 of FIG. 1A) is preferably sent by the enterprise's resources to the CDSP, which performs the modifications and then returns the modified result to the enterprise. This approach allows the CDSP to efficiently and flexibly determine its own storage locations for content that will be dynamically offloaded from the enterprise to the CDSP during peak mode. Once the CDSP determines a new storage location for embedded content referenced in a particular file, it preferably stores a mapping between the original URL and the modified URL, and returns the modified content (which contains any rewritten/replaced URLs) to the enterprise. The enterprise is then preferably responsible for caching this modified content, and for managing the modification as a cache variant of the original content. (As is known in the art, use of cache variants causes the modified content to be automatically invalidated whenever the corresponding original, i.e. unmodified, content is invalidated. This type of cache invalidation preferably occurs using features of prior art caching systems.)

As an example of the mapping between an original URL and a modified URL, the CDSP may use a renaming strategy in which the original URL is modified in a predictable manner. This is illustrated by original URL 110 and modified URL 160 in FIGS. 1A and 1B, where it can be seen that the content owner's domain name 120 is replaced at 170 by the CDSP's domain name, and the content owner's domain name is then used as part of the path name within the CDSP's resource naming conventions. The information which identifies a particular file (see element 130) may be copied directly to the CDSP's URL (see element 190). A mapping such as this is also easily reversible, which is advantageous during a cache miss situation where the CDSP receives the modified URL but needs to know the original URL so that it can request the content from the content owner. (While it may be necessary in some cases to explicitly store the mapping between the original URL and modified URL, this storing operation may be omitted if the mapping is generated in a repeatable and reversible manner, as has been done in the example.)

When content modification is performed, the transmogrifier function also preferably notifies the background task executing on the enterprise resource that the embedded content (i.e. the content referenced by the rewritten URLs) should be fetched and delivered to the CDSP for caching.

Note that if the optional intermediate mode is not used, then the content modification and caching occurs "on-the-fly" when peak mode processing begins.

It is known in the art for content owners to modify the URLs in their Web pages to leverage a CDSP's geographically-distributed caches, in order to improve end user response time by serving static content from external caches which may be located closer to the end users than the content owner's own resources. This type of rewriting is also performed in the prior art to remove processing load from a content owner's systems. However, the techniques disclosed herein (whereby, inter alia, dynamic, temporary modifications are performed based upon user-configurable metrics) are not known in the art.

A brief review of caching systems will now be provided, making reference to FIGS. 3A, 3B, 4A, and 4B. The goal of a caching system is to store or "cache" content at a location (or at multiple locations) in the computing network from which the content can be returned to the requester more quickly, and which also relieves the processing burden on the back-end systems by serving some requests without routing them to the back-end. Caching systems may also be referred to as "web caches", "cache servers", or "content caches". Two basic approaches to caching systems are commonly in use. These are called (1) proxies, also known as "forward proxies" and (2) surrogates, also known as "reverse proxies". Each of these will now be described.

Figure 3A:
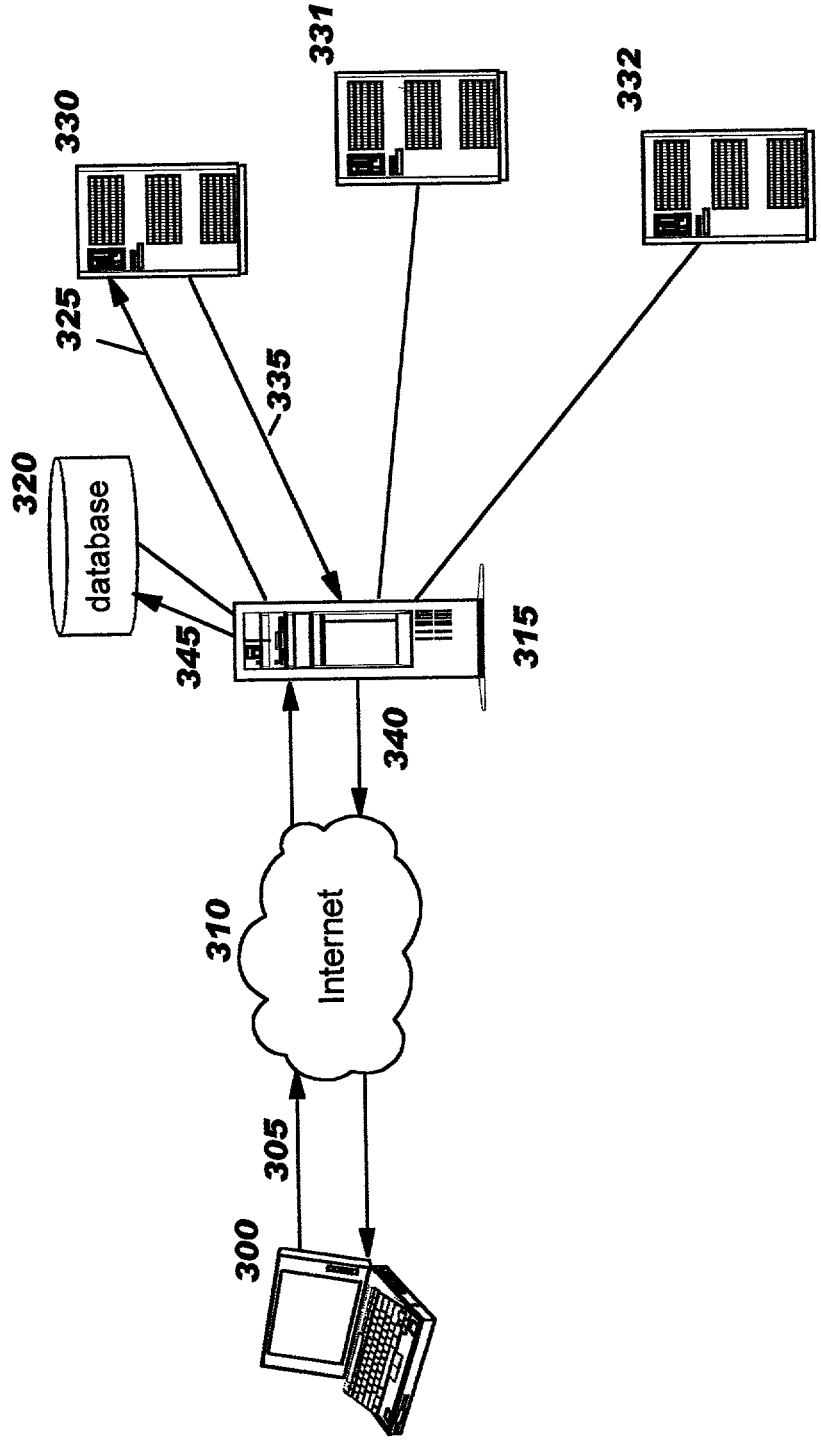
FIGS. 3A and 3B depict a forward proxy configuration.
Figure 3B:
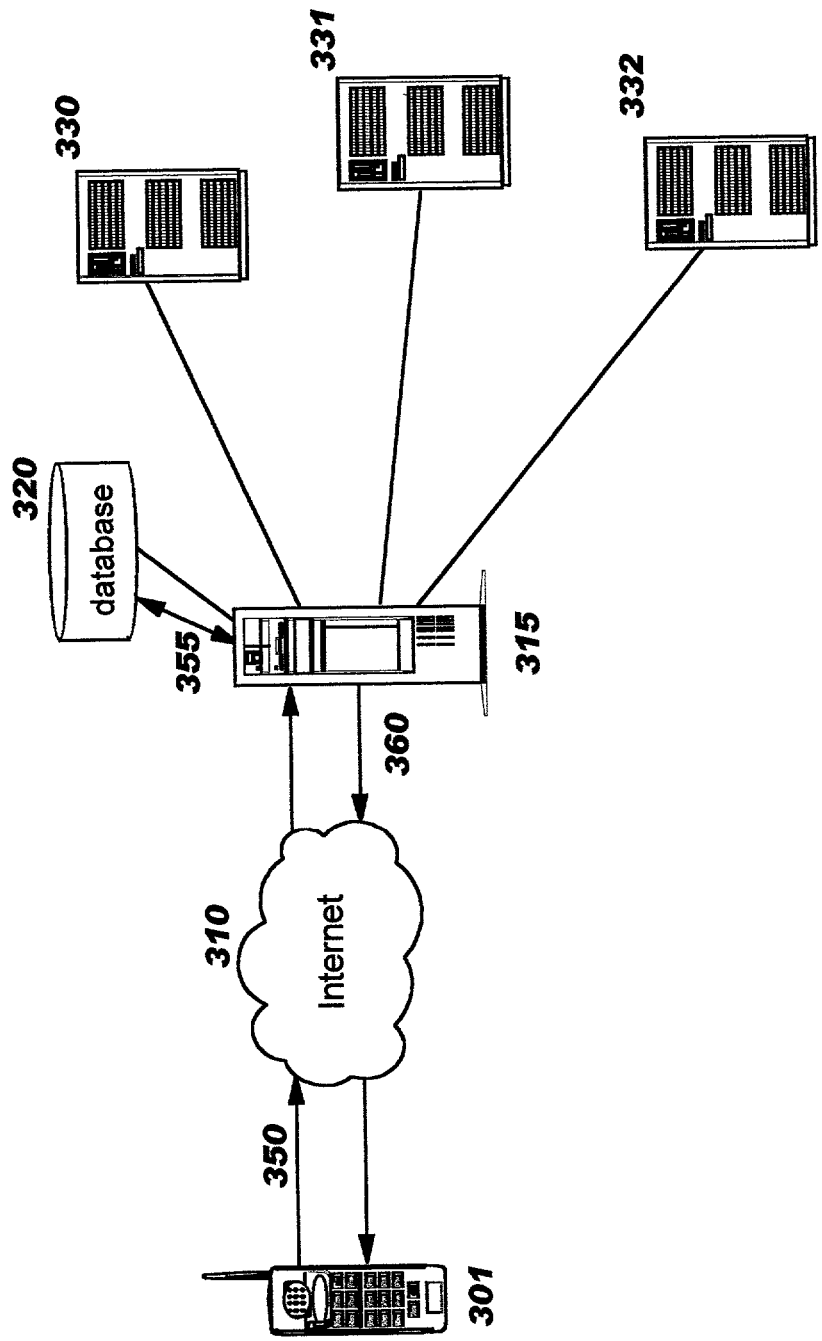

A forward proxy configuration is shown in FIGS. 3A and 3B. Forward proxies function in what is known as a "client pull" approach to content retrieval. That is, the forward proxy functions on behalf of the client (for example, a user agent, referred to herein as a browser) to either deliver content to the client directly from the proxy's accessible cache storage, if the requested content is already in the cache, or to request that content from a content server otherwise. FIG. 3A shows a client 300 requesting 305 some content, where this request 305 travels through the Internet 310 and reaches a forward proxy 315. In FIG. 3A, it is assumed that the requested content is not yet available from proxy 315's cache storage 320. Therefore, proxy 315 sends 325 its own request for that content to a content server 330. (For purposes of illustration but not of limitation, a content server is also referred to herein as a "Web server"). It may happen that proxy 315 also functions as a load balancing host or network dispatcher, whereby it selects a content server 330 from among several content servers 330, 331, 332 that are available for servicing a particular request. The WebSphere® Edge Server is an example of a solution providing both load balancing and proxy caching. A separate load balancing host might be placed in the network path between proxy 315 and content servers 330, 331, 332 as an alternative. This has not been illustrated in FIGS. 3A and 3B. (FIGS. 5 and 6, described below, show a load balancing function as being logically separate from the proxy caching function.)

Preferred embodiments are described herein primarily with reference to configurations where the cache is located upstream from the load balancer, although this is by way of illustration and not of limitation. A cache server might be located elsewhere in the network path between the content requester and the Web server(s). For example, a cache server might be encountered before a content request 310 reaches a load balancing host 330. In some distributed computing environments, a plurality of caches may be located in a particular network path.

Returning to the description of the content request scenario, content server 330 obtains the requested content and returns 335 that content to the proxy 315. To obtain the requested content, a particular content server may invoke the services of an application server (such as a WebSphere® application server which is available from IBM), where this application server may be co-located with the content server 330 in a single hardware box or may be located at a different device (not shown). The Web server may also or alternatively invoke the services of a back-end enterprise data server (such as an IBM OS/390® server running the DB2® or CICS® products from IBM), which may in turn access one or more databases or other data repositories. These additional devices have not been illustrated in the figure. ("OS/390", "DB2", and "CICS" are registered trademarks of IBM.)

After proxy 315 receives the content from the content server 330, proxy 315 returns 340 this content to its requesting client 300. In addition, proxy 315 may store 345 a locally-accessible copy of the content in a data store 320 which is used as cache storage. (There may be cases in which content is marked as "not cachable", and in these cases, the store operation 345 does not occur.) The benefit of using this forward proxy and its data store 320 is illustrated in FIG. 3B.

FIG. 3B illustrates a scenario in which a different client 301 (or perhaps the same client 300) which accesses proxy 315 makes a request 350 for the same content which was requested in FIG. 3A. This request 350 again travels through the Internet 310 and reaches the forward proxy 315. Now, however, assume that the requested content was stored in proxy 315's cache storage 320 following its earlier retrieval from content server 330. Upon detecting that the requested content is locally-accessible, proxy 315 retrieves 355 and returns 360 that content to the requesting client 301. A round-trip from the proxy 315 to the content server 330 has therefore been avoided, saving time and also freeing content server 330 to perform other functions, thereby increasing the efficiency of the back-end resources while providing a quicker response to the requesting client.

As a forward proxy continues to retrieve content for various requests from content servers, it will populate its cache storage with that content. Assuming that the system has sufficient storage to accumulate a proper "working set" of popular content, the ratio of requests which can be served from cache should grow after the initial populating process, such that fewer requests are routed to the back-end.

Figure 4A:
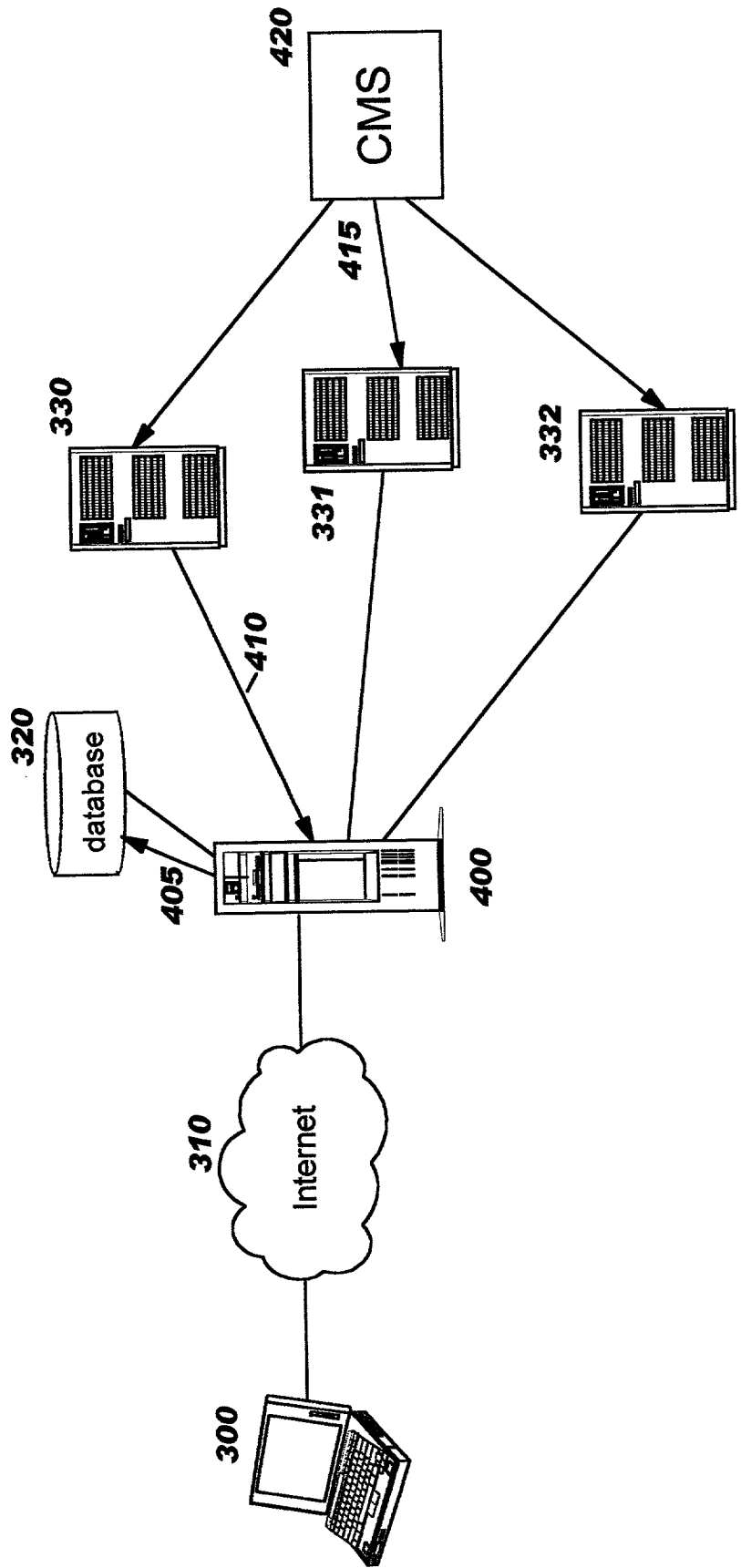
FIGS. 4A and 4B depict a reverse proxy (surrogate) configuration, according to the prior art.
Figure 4B:
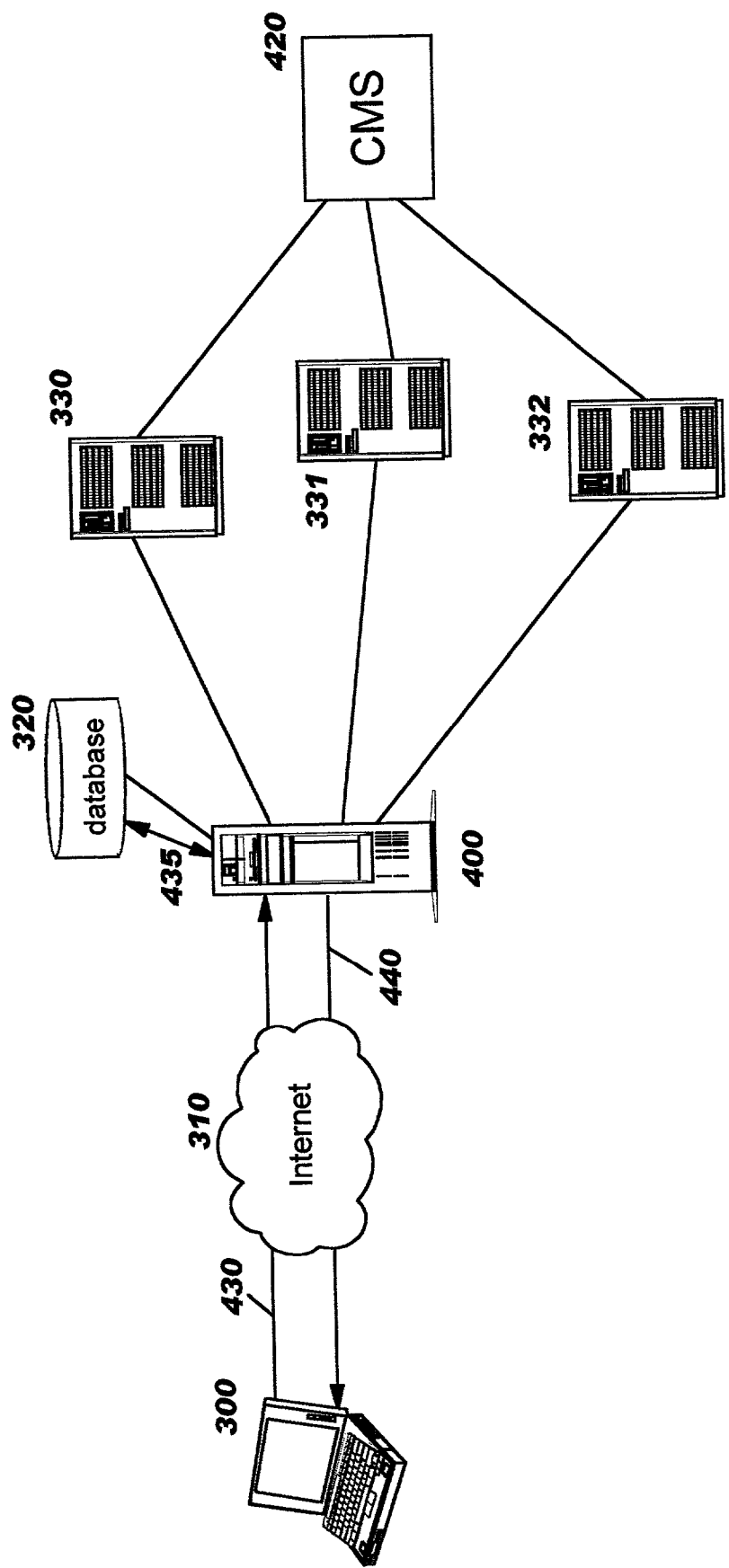

A surrogate configuration is shown in FIGS. 4A and 4B. Surrogates function in a "server push" approach to content retrieval. That is, a content server pushes content to a surrogate based upon determinations made on the back-end of the network. For example, a content creator might know that certain content is likely to be heavily used, and can configure a content server to push that content proactively to the surrogate, without waiting for clients to request it. Or, a content developer might use a content management system (shown as "CMS" 420) to push content to surrogates. Then when requests for that content do arrive from clients, the requests can be served directly from the cache storage without making a request of the back-end resources and waiting for a response. FIG. 4A shows a CMS 420 pushing content 415 to content servers 330, 331, 332. A selected one of these content servers 330 is depicted as notifying 410 the surrogate 400 of the new content, which the surrogate then stores 405 in its cache 320. The benefit of using this surrogate and its data store 320 is illustrated in FIG. 4B.

FIG. 4B illustrates a scenario in which a client 300 which accesses surrogate 400 makes a request 430 for content which was pushed out to the surrogate's cache as shown in FIG. 4A. This request 430 travels through the Internet 310 and reaches the surrogate 400. Upon detecting that the requested content is locally-accessible, the surrogate 400 retrieves 435 and returns 440 that content to the requesting client 300. As with the scenario illustrated in FIG. 3B, a round-trip from the surrogate 400 to the content server 330 has therefore been avoided, decreasing response time to the requesting client 300 and reducing the processing load on the back-end system.

In some cases, the functions of a proxy and surrogate are combined to operate in a single network-accessible device. IBM's WebSphere Edge Server is a caching solution that can be configured to function as either a forward proxy or a surrogate, or both. The caching proxies with which preferred embodiments of the present invention are used are preferably surrogates (or a combined surrogate and forward proxy), but may alternatively be forward proxies.

An implementation of the present invention may be deployed within different system architectures. Two representative deployment scenarios will now be described in more detail, making reference to the configurations in FIGS. 5 and 6.

Figure 5:
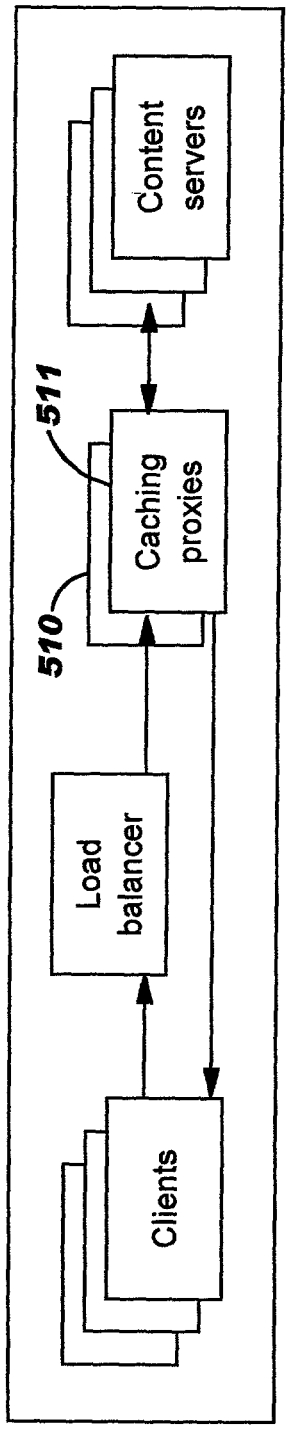
FIG. 5 shows a deployment scenario in which the load on each of an enterprise's caching proxies is independently monitored.

FIG. 5 illustrates a deployment scenario in which the load on each caching proxy is independently monitored, and each proxy may therefore enter (and exit) peak mode irrespective of demand on the other proxies. In this deployment scenario, all requests from clients flow to the load balancer and then to the caching proxies. (The responses preferably bypass the load balancer, and flow directly from the caching proxies to the requesting clients.) The mode detection and background processing functions operate independently on each caching proxy. In this manner, the performance of individual proxies can be separately monitored and dynamic content modifications can be made to prevent each proxy from becoming overloaded.

Preferably, the mode detection (i.e. workload analysis) function in this scenario uses metrics pertaining to each individual proxy. For example, the number of active connections at proxy 510 might be within the nominal mode range, while the number of active connections at proxy 511 might be sufficiently high to trigger the intermediate mode or perhaps the peak mode for that proxy. Thus, content modifications would be performed for the requests being served by caching proxy 511, but original content would continue to be served from proxy 510. The scenario in FIG. 5 also lends itself well to monitoring different metrics at the various proxies, if that is desirable in a particular enterprise.

The scenario in FIG. 5 is advantageous in situations where the limiting factor in an enterprise's deployed resources is the caching proxies. If, on the other hand, the content servers are the limiting factor for supporting the enterprise's traffic demands, then the deployment scenario in FIG. 6 will typically perform better.

Figure 6:
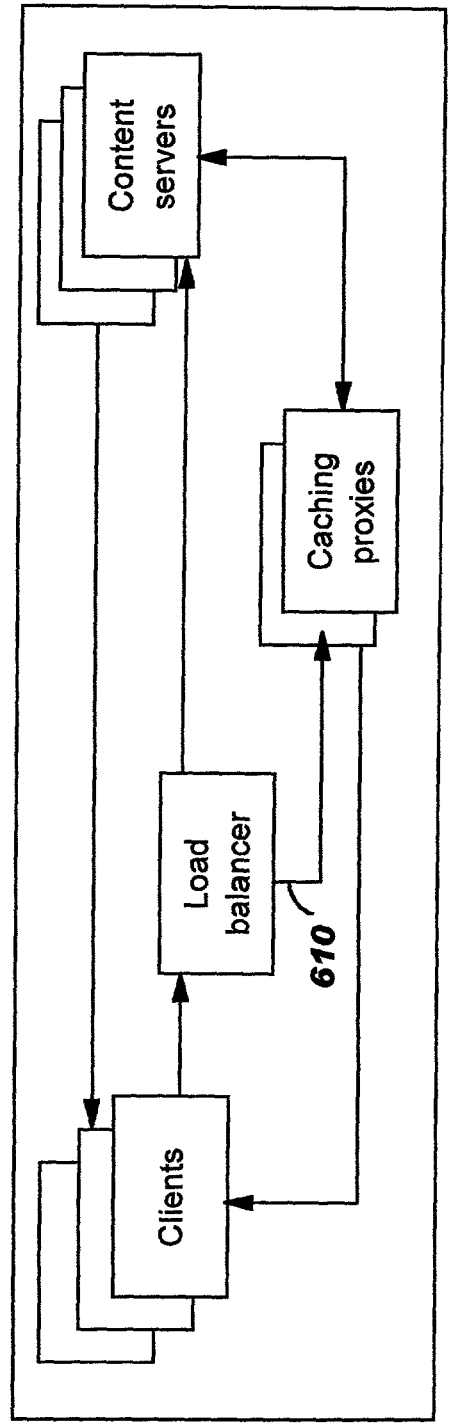
FIG. 6 shows an alternative deployment scenario where the load on a group of resources is monitored collectively, according to embodiments of the present invention.

In the scenario depicted in FIG. 6, the workload monitoring and mode detection is preferably performed by the load balancer. This approach enables the load balancer to take a system-wide view of current traffic, and determine when content modification is appropriate for the collection of monitored resources as a whole. In preferred embodiments, the load balancer is configured to consult load balancing policy (which may, for example, be specified as a collection of rules) and this policy information is evaluated to determine when content should be modified. (Note that the previously-discussed modes and mode thresholds are not used in the same manner for the scenario of FIG. 6, since content modification decisions are based on the load balancing policy. This will be described below.)

In the deployment scenario illustrated in FIG. 6, requests are sent directly from the load balancer to the content servers under nominal workload conditions. (This does not, however, preclude providing one or more caching proxies in front of the content servers.) Responses are then returned from the content servers (or caching proxy, when appropriate) to the requesting clients.

If the load balancer operating according to the present invention detects that a load balancing policy is exceeded (perhaps based upon the effective bandwidth or the total number of connections currently supported by the system), then workload may be balanced between the content servers and the caching proxies through use of the techniques disclosed herein. That is, the load balancer will begin to route incoming requests to the caching proxies as shown at 610, and (once the caching proxies are populated with content being requested by the clients) the processing demand on the content servers will thereby be reduced. In this case, if the caching proxies include their own implementation of the mode detection logic, the intermediate and peak threshold values evaluated by that logic are programmatically set to zero. This causes all subsequent mode detection operations performed by all of the caching proxies to detect peak mode conditions, meaning that all subsequent requests reaching the caching proxies will be treated as peak mode requests.

Content modifications will then be performed for the requests being served by the caching proxies, while original content continues to be served for requests reaching the content servers. (Note that caching proxy functions may in some cases be located on the same device which performs the content server functions, although this has not been illustrated in FIG. 6.)

Preferably, the load balancing policy evaluated by the load balancer is adapted for detecting a return to nominal operating conditions. When that happens, the intermediate and peak threshold values evaluated by the logic in the caching proxies are preferably programmatically reset to their previous non-zero values. In addition, the load balancer ceases to route content to the caching proxies when peak mode subsides.

By way of review, in the scenario depicted in FIG. 5, the workload evaluation and mode detection are performed by each caching proxy, with reference to that caching proxy's own current conditions. If a change is needed, the caching proxy begins content modification. In contrast, for the scenario in FIG. 6, the workload evaluation and mode detection are performed by the load balancer, with reference to the current conditions of a group of content servers. If a change is needed, the caching proxies become involved with request processing, and these caching proxies begin performing content modifications and serving modified content.

The table in FIG. 7 provides a summary of the two deployment strategies which have been described with reference to FIGS. 5 and 6. This table states the focus of both deployment scenarios, examples of the metrics that may be used when monitoring workload in each scenario, and the configurable thresholds that may be set to influence results of the monitoring.

Preferably, the load balancing function in the deployment scenarios of both FIG. 5 and FIG. 6 operates at layer 4. As is known in the art, layer 4 load balancing is very efficient. Because the deployment strategy illustrated in FIG. 5 requires access to proxy-specific workload conditions, the workload monitoring is located in the caching proxies rather than in the load balancer (because the latter approach would require a layer 7 implementation, which is less efficient than a layer 4 implementation of load balancing).

Referring now to FIGS. 8A and 8B, the flow of messages for the deployment strategy of FIG. 5 is illustrated. (This discussion applies in an analogous manner to the scenario in FIG. 6, where the initial requests are sent to a content server until reaching peak mode, in which case requests begin to be directed to caching proxies, as has been described.) In FIG. 8A, a client request 801 for content is received by a caching proxy. Suppose that the caching proxy is operating in nominal mode. The caching proxy responds at 802 by sending unmodified content. For example, HTML document 100 of FIG. 1A might be returned. Because this content includes an embedded image link, another request 803 is automatically sent from the client (i.e. from the browser executing on the client device). The message flow in FIG. 8A assumes that the caching proxy also receives this request 803, and has the requested image in its cache; a response 804 is therefore returned from the caching proxy to the client to transmit the image file. (Alternatively, the image link might specify that message 803 should be directed to another of the enterprise's resources, in which case that other resource provides response message 804.)

Now suppose that the client's request was received during peak mode conditions (or that the request triggered peak mode). This scenario is depicted in FIG. 8B. The client's request 801 is received by the caching proxy, but because the request is processed in peak mode, the response 852 returned by the caching proxy now contains modified content, such as the HTML document 150 in FIG. 1B. When the client's browser generates the subsequent request for the referenced image file, the modified URL received at the browser will cause the request 853 to be directed to the CDSP's network domain. When the request is received at the CDSP resource, that resource will attempt to serve the requested content from local cache. If the content is available in cache, then a response message 854 returns the requested file (which in the example is an image file) to the client. However, in the event of a cache miss (i.e. when the requested content is not yet locally cached), the operational details may vary from one CDSP to another. In preferred embodiments, prior art cache miss processing is invoked, whereby the CDSP resource will serve a "client redirect" message to the requesting client. For example, when the HyperText Transfer Protocol ("HTTP") is being used for exchanging request and response messages, existing "redirect" features of HTTP are preferably used to dynamically create a network path between the requesting client and a system on which the requested file is stored. This redirect processing comprises sending a special return code on response message 854, where this return code automatically triggers the browser to request the content from a location specified in the response message 854. This location preferably identifies the origin site for the requested file (i.e. a resource deployed by the enterprise itself). Preferably, the CDSP knows the location of the resource within the enterprise by the previously discussed mapping between original URLs and modified URLs (which the CDSP creates when generating the modified URLs in the content served by the caching proxy at 852). While the client browser is issuing the content request resulting from the redirect, the CDSP retrieves the same content from that location and loads the content into the local CDSP cache.

By way of review, HTTP redirect messages are commonly used when a Web page moves from one location to another. To enable incoming requests which use a moved Web page's now-obsolete address to continuing functioning, a Webmaster may deploy a small Web page containing a redirect indication or directive for that obsolete address, where the directive in this small Web page points a requester to a new location. When a browser (or, equivalently, other user agent) requests a Web page for which a redirect indication has been deployed, the standard functioning of the HTTP protocol causes the browser to automatically request the Web page at its new location, responsive to receiving a redirect return code. For example, suppose the content of a Web page which is normally accessed using the URL "www.ibm.com/samplePage.html" is moved such that it is now accessible using the URL "www.ibm.com/newSamplePage.html". Many already-stored references to the original URL might be in existence, and it is desirable to enable such references to continue functioning in a relatively transparent manner. The redirect support in HTTP allows this to happen. When a request for the original URL arrives, an HTTP response message containing a special redirect status code, along with the new URL, is returned to the requester instead of the requested content (and, importantly, instead of an error code). When the browser receives the HTTP response message, it detects the redirect status code and automatically sends another request, this time using the new URL from the HTTP response message.

Several different types of redirect indications are defined in HTTP, and all use a "3xx" format—that is, a 3-digit message status code beginning with the number 3. In HTTP 1.1, the codes are taken from the set (300, 301, 302, 303, 304, 305, 307). See Request For Comments ("RFC") 2616 from the Internet Engineering Task Force ("IETF"), titled "Hypertext Transfer Protocol—HTTP/1.1" (June 1999), section 10.3, which is entitled "Redirection 3xx", for a detailed description of these status codes. (This RFC is referred to hereinafter as "the HTTP Specification".)

Similar redirect processing is defined in other transfer protocols. For example, in a wireless networking environment, a protocol such as the Wireless Session Protocol (commonly referred to as "WSP") may be used instead of HTTP. References herein to use of HTTP are therefore intended to include analogous protocols such as WSP. (For more information on WSP, see "Wireless Application Protocol, Wireless Session Protocol Specification", WAP-230-WSP, 5 Jul. 2001, which is available on the Internet at www.wapforum.org. This document is referred to herein as "the WSP Specification".) Table 36 of the WSP Specification defines redirect codes which are counterparts to HTTP's 3xx status codes. These WSP status codes use a 0×3n format, where "n" takes the values between 0 and 7. (Note that Section 8.2.2.3, "Redirect", of the WSP Specification states that sending a redirect protocol data unit may be used as a "crude form of load balancing at session creation time". That is, a server might return a redirect code as a way of transferring traffic to a different server. Load balancing techniques of this type are known in the art, whereby session handoff may be performed at run-time. However, this is distinct from the approach of the present invention, which may employ redirection during a cache miss while processing embedded content requests that dynamically and temporarily reference a CDSP's resources. In addition, the techniques used to determine how load should be balanced among Web servers in the prior art approach described in the WSP Specification are typically based on spreading the workload among the servers in an enterprise, whereas the techniques of the present invention are concerned with redirecting traffic outside the enterprise.)

In preferred embodiments of the present invention, the redirect processing performed at the CDSP operates using existing code (i.e. no special adaptation of the redirect processing is required). Typically, prior art redirection uses HTTP status code 302 for temporarily redirecting file requests. As defined in the HTTP Specification, status code 302 has the semantic meaning of "Found" (that is, the requested file was found, but is temporarily located at another address). This status code is appropriate when a file is temporarily located at a URL other than the one the client originally used for the request. (This "originally used" URL identifies a resource that was to be served from the CDSP's resources, according to the content modification performed by the present invention.) Status code 302 therefore notifies the client to re-request the file from the temporary URL, but not to overwrite the original URL in its reference. (The temporary URL identifies a resource of the enterprise, from which the CDSP is also concurrently retrieving the content, according to the present invention.) It may be presumed that the CDSP will be able to retrieve that content, and cache it locally; thus, subsequent requests using the "original" URL can then be satisfied from the local CDSP cache, and the temporary redirect processing will no longer be needed.

Optionally, the CDSP's cache may be loaded proactively in order to reduce the number of cache misses that occur. One way in which this may be done is for the workload monitoring function of the present invention to generate client requests to the CDSP when a client request for content arrives during intermediate mode. When this request is received at the CDSP, cache miss (i.e. redirect) processing will be triggered, whereby the CDSP will automatically request the content (from the original URL, which points to a location on the content owner's resources) and create a copy in local cache.

In preferred embodiments, the content-modifying code (i.e. the code that modifies URLs in a requested document, such as creating document 150 of FIG. 1B from document 100 of FIG. 1A) is configurable, based upon a set of rules that specify (1) which documents are eligible for modification, and (2) which tags in those eligible documents are eligible for modification. Preferably, the eligible documents are identified based upon pattern(s) in the document's own URL, and the eligible tags are identified using pattern matching as well.

For example, it might be desirable to specify that all documents associated with a particular server site are eligible for content modification. (The term "server site", in this case, refers to a collection of server nodes that serve Web content associated with a given fully-qualified domain name. For example, a server site might, for purposes of example, serve content for a domain name such as "www.ibm.com".) As an example of identifying eligible tags, patterns might be provided to match all "<image>" tags, or all "<audio>" tags, or all URLs which have a file type of ".gif", and so forth.

Referring now to FIG. 9, a sample DTD is provided that may be used to define the allowable syntax for such rules. According to this sample DTD, rules are supported for either rewriting a URL or replacing a URL. Rewriting a URL means that the "src" attribute of the URL is rewritten (thereby identifying an alternative content location). Replacing a URL means that the entire HTML tag is replaced by alternative text that is preferably supplied within the replace rules using an "alt" attribute. (This type of textual replacement was discussed previously with reference to a streaming video file example, and in effect clips embedded content out of the document.)

In preferred embodiments, the rules that configure the content-modifying code are specified as an XML document. A sample document 1000 is provided in FIG. 10A. As shown therein, a <pattern> element uses a "filterURL" attribute to identify documents which are to be evaluated for content modification. In this example, using an "*" as a wildcard at the end of the pattern, the pattern identifies all documents having a URL that begins with "http://w3.ibm.com/" (see 1010). A <rewrite> element (see 1020) has "locatePattern" and "mapPattern" attributes that identify other elements within document 1000 where the tags that are eligible for content modification, and the modification to be performed on those tags, is specified. In this example, the "locatePattern" attribute identifies the <locatedURLAttributeRewrite> element named "image" (see 1030), and the "mapPattern" attribute identifies the "urlMap" element named "map" (see 1060).

The "src" attribute 1040 of the <locatedURLAttributeRewrite> element in this example has the value "img[ ]src". This value indicates that any <img> tags which have a "src" attribute in the document being inspected are to be modified according to the corresponding "mapPattern" element (as identified in the <rewrite> element 1020). A "caseSensitive" attribute 1050 is also provided to specify whether the tag/attribute matching process is case sensitive.

The "from" attribute 1070 of the <urlMap>0 element uses a wildcard "*" in this example, indicating that any value of the "src" attribute on <img> tags is to be rewritten. The "to" attribute 1080 provides the replacement value, which for this example is "http://www.cdsp.xxx/ibm.com/*".

FIGS. 10B and 10C provide an example showing application of these sample rules. For purposes of the example, it is assumed that the sample input document of FIG. 10B has the URL "http:/w3.ibm.com/sample.html", and therefore matches the URL pattern specified at 1010. Thus, this document is inspected for presence of <img> tags having a "src" attribute, and the tag at 1090 is found to match this pattern. The value of the attribute at 1090 is "/image/logo.gif", presumably identifying the location of an image file on the content owner's file system. Applying the content modification specified in the <urlMap> element yields the sample output document in FIG. 10C, where the "src" attribute on the <img> tag now has the value "http:www.cdsp.xxx/ibm.com/image/logo.gif", which presumably identifies the location of a copy of the image on a CDSP's file system.

This example illustrates use of a rewrite rule. As stated above, rules may also be written for replacing URLs with text. It will be obvious from this example, and the DTD in FIG. 9, how a replacement rule can be written.

FIG. 11 provides an example of how load balancing policy might be specified using a collection of rules, for use in the deployment scenario of FIG. 6. Suppose that the configuration for a particular deployment includes two content servers called "contentServer1" and "contentServer2" and one caching proxy called "cachingProxy", and that the load balancer acts as a site called "www.mysite.xxx" with port 80 by which the clients can access these servers. The policy rules depicted in FIG. 11 may be interpreted by the load balancing component as follows:

(1) Each of the rules specifies the site to be monitored using a "Site" parameter.

(2) The rules further specify which port on that site is to be monitored, using a "Port" parameter.

(3) Rules 1 and 3 specify a "Nbr_Active_Connections" parameter, which in this example is a reference to a site-wide counter of the current number of active connections for the specified port at the specified site. In Rule 1, the value of this parameter is compared to a previously-configured threshold "Max_Active_Connections", which in the example indicates the maximum number of active connections that may be supported in nominal mode. Thus, if the threshold is exceeded, then peak mode is entered, and Rule 1 specifies that content requests are to be directed to "cachingProxy".

Rule 3 also tests the number of active connections, but now compares that value to a different threshold "Min_Active_Connections", which in the example indicates a lower threshold value that determines when peak mode has been exited. When this rule evaluates to True, content requests are to be directed back to the content servers "contentServer1" and "contentServer2".

(4) Rules 2 and 4 specify a "Bandwidth" parameter, which in this example is a reference to the site-wide current bandwidth demands for the specified port at the specified site. The value of this parameter is compared to a previously-configured threshold "Max_Bandwidth", which in the example indicates the maximum bandwidth that may be supported in nominal mode. Thus, if the threshold is exceeded, then peak mode is entered, and Rule 2 specifies that content requests are to be directed to "cachingProxy".

Rule 4 also tests the current bandwidth, but now compares that value to a different threshold "Min_Bandwidth", which in the example indicates a lower threshold value that determines when peak mode has been exited. When this rule evaluates to True, content requests are to be directed back to the content servers.

Rules might be written to use other thresholds, such as the total number of connections (rather than the number of active connections). As will be obvious, the values being compared depend on what values are accessible to an implementation of the present invention.

The rules are preferably evaluated in the order in which they are specified. Thus, it may be preferably to put all the "entering peak mode" thresholds first, followed by the "exiting peak mode" thresholds, in order to evaluate multiple conditions for entering peak mode. Furthermore, complex rules might be written that test multiple thresholds within the same rule.

As will be obvious, the syntax in FIG. 11 is merely one example of how load balancing policy might be specified, and an implementation of the present invention may use an alternative load balancing policy specification technique without deviating from the concepts disclosed herein.

Figure 12:
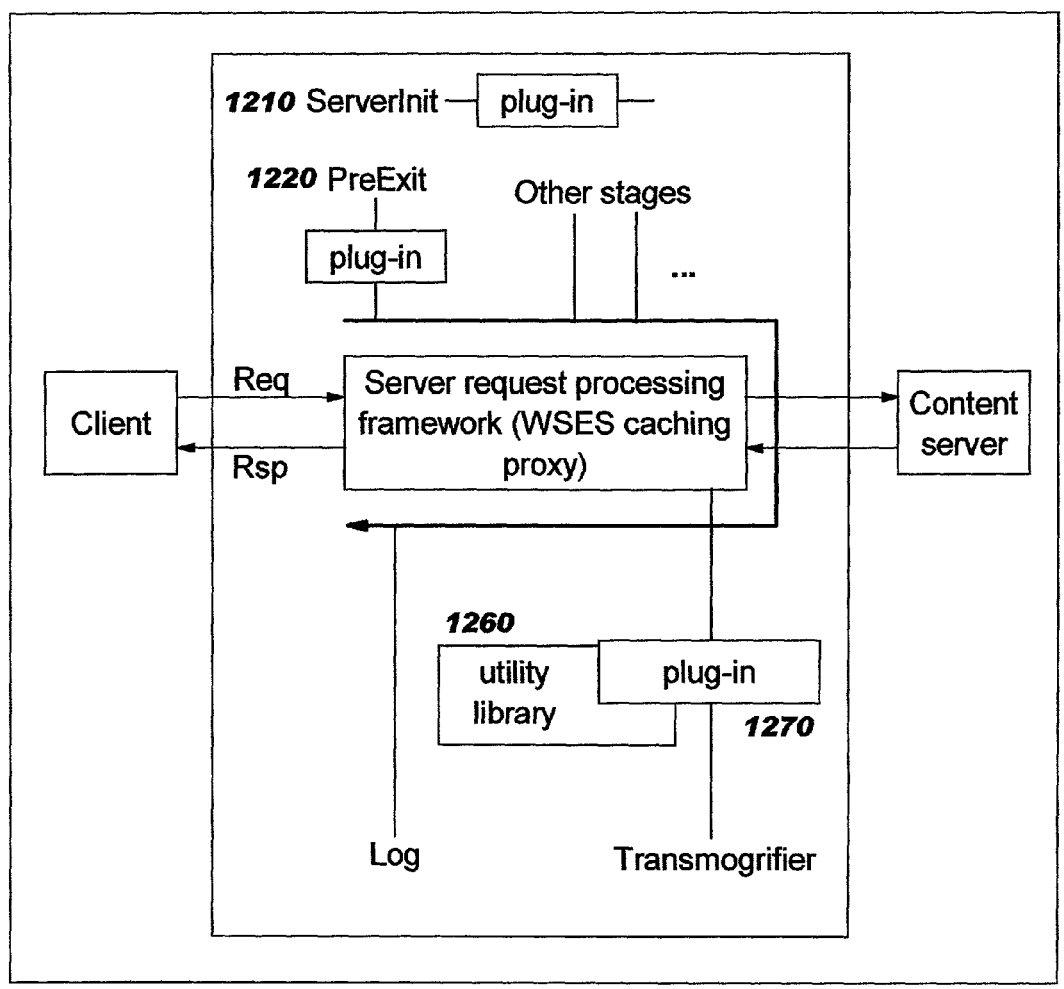
FIGS. 12 and 14 illustrate components which may be used in preferred embodiments.

Referring now to FIG. 12, components which may be used in preferred embodiments will be described. As stated earlier, the present invention may be implemented using plug-ins to a caching proxy such as the WSES caching proxy, and the content modifying code may be provided as an extension for such proxies (or in a load balancing component), or the content modifying code may be provided by the CDSP as an agent. The content-modifying code preferably implements two interfaces: (1) a Transmogrifier plug-in and (2) a pair of callback functions.

FIG. 12 shows a "ServerInit" plug-in 1210. In preferred embodiments, the ServerInit plug-in performs basic setup for operation of the present invention, including spawning a background thread to handle off-line content modification. (By modifying content as an off-line process, the on-line responses can be served as quickly as possible. This has been described above with reference to intermediate mode processing. In preferred embodiments, when intermediate mode is used, the only case where content will normally be modified on-the-fly is non-cacheable content served during peak mode, for example personalized content which is marked as non-cacheable. Preferably, the user is given a configuration option to control this type of on-the-fly modification. Refer to the discussion of FIG. 13 for more information on this configurable option.) The ServerInit plug-in is described in more detail below, with reference to FIG. 13.

During request processing, a PreExit plug-in 1220 performs mode determination (which has been previously described). When this PreExit plug-in detects peak mode conditions, it enables already-modified content to be served from the local cache. (According to preferred embodiments, the PreExit plug-in signals the Transmogrifier plug-in to return HTML document 150 of FIG. 1B to a requesting client during peak mode, rather than HTML document 100 of FIG. 1A.)

The Transmogrifier plug-in 1270 invokes a utility library 1260 to determine if content modification should be performed. See the discussion of FIGS. 15-20, below, for more information on this processing. Based upon the determination of whether content should be modified, the utility library in turn queues tasks for the background thread, as appropriate.

The plug-ins depicted in FIG. 12, and the callback functions in the content modifying code, will now be described in more detail.

The ServerInit plug-in 1210 preferably initializes operation of the present invention by parsing parameters which are specified in the enterprise's capacity-on-demand configuration file. (As stated earlier, one way in which the parameter values may be obtained is by prompting a user through a GUI.) The table in FIG. 13 describes representative parameters that may be provided in the configuration file. Values for the "INTERMEDIATE_THRESHOLD" and "PEAK_THRESHOLD" parameters 1310, 1320 are preferably of type integer, and are used to determine when current operating conditions cross from one mode into another (as has been described). A "MINIMUM_MSEC_IN_MODE" parameter 1330 may be used to specify the measurement interval used when performing the mode analysis. The value of this parameter is preferably an integer, representing the number of milliseconds in the measurement interval. (For example, if the metric is active connections, then the value of this measurement interval parameter specifies for how many milliseconds the connections should be counted.)

The "CONVERT_NONCACHEABLE_CONTENT" parameter 1340 is optional, and preferably has a binary value indicating whether the user wishes to perform on-the-fly modification of non-cacheable content. For example, if a user is requesting her bank statement, and the HTML file used to deliver the bank statement information to her browser is marked as non-cacheable, then it may be that there is very little efficiency (if any) to be gained by re-directing requests for embedded content (such as an image file containing the bank's logo) to a CDSP. Thus, this flag can be set to false to indicate that such content requests are to be served from the enterprise's site, regardless of the current operating mode.

The optional "USAGE_COUNT_THRESHOLD" parameter 1350 preferably has an integer value, and may be used to specify the minimum "popularity" of cached content as a prerequisite to performing the content modification and caching operations that provide a cache variant of the original content. (Typically, modifying only "popular" content using techniques of the present invention will result in improved utilization of cache resources.) The value represents the minimum number of times cached content has been served to be considered "popular content". Preferably, the MINIMUM_MSEC_IN_MODE value is used to determine the time interval in which the counting occurs.

A "MAX_AGE" parameter 1360 is preferably used to control the lifetime of modified content. This parameter preferably has an integer value, and specifies the time-to-live (in seconds) applied to all modified content served during peak mode. This approach provides a measure of control over outbound caches, thus setting an upper bound on the duration of unnecessary usage of the CDSP's services. For example, it may happen that the modified content served to a requester travels over network segments which provide their own caching. Internet Service Providers ("ISPs") often provide this type of caching to improve response time to their users. Because the modified content created according to the present invention specifies URLs on the CDSP's site, it is desirable to limit the time interval in which this externally-cached information will continue to be used (thereby limiting the pay-per-access charges incurred by the enterprise that is making use of the present invention to offload traffic to the CDSP). When the time-to-live value is exceeded, the cached content will be considered stale, according to prior art HTTP processing, and will therefore be purged from the external cache. Requests for the content will then return to the enterprise, where the request will be evaluated and served according to the current operating mode.

The value of the "VARIANT_FILE_NAME" parameter 1370 is preferably a string, and names a temporary file that will be used to save modified content as a cache variant.

After initializing operations, the ServerInit plug-in 1210 preferably spawns a background thread for background content modification and caching. Preferably, the background thread operates on "tasks" that are submitted from a transmogrifier 1270 (or, equivalently, by functions of the utility library 1260, after being invoked by transmogrifier 1270).

In preferred embodiments, a task includes the following information: (1) a fully-qualified URL from which content is to be fetched; (2) the method type (e.g. GET or POST) of the request which triggered this task; (3) the protocol (e.g. HTTP or WSP) of the request which triggered this task; (4) other request headers which may be present on the request; and (5) pointers to the callback functions for performing content modification.

The background thread preferably blocks until a new task is available. When a new task is ready to be processed, the thread is unblocked and retrieves the task. The thread then checks to see if: (1) the content referenced by this URL is still cached (i.e. whether the content to be modified is available in cache storage); (2) the modified content is not already cached (because if so, there is no need to perform the modification again); and (3) the content to be modified is sufficiently "popular" to warrant modification (according to the customer-specified USAGE_COUNT_THRESHOLD parameter).

If all of these conditions are met, then the callback functions of the content modification code are invoked to modify the content. In the first callback function, the content modification is performed. In the second, memory which was allocated when creating the modified content is released. The modified content is then cached as a variant of the original. The background thread again blocks until a new task is available, and the process repeats.

In the deployment scenario illustrated in FIG. 5, the PreExit plug-in 1220 is responsible for determining the current operating mode, using a metric such as the number of active connections to the caching proxy. In preferred embodiments, plug-ins in a WSES environment have access to a read-only variable "CONNECTIONS", whose value is the number of active connections to this caching proxy, and this value may be used during the mode determination. Preferably, mode determination is the result of comparing metric values taken over a period of time (where the time period is specified as the value of the "MINIMUM_MSEC_IN_MODE" parameter 1330). By counting the metric values in terms of mode thresholds (that is, each metric value is classified as falling into either the nominal, intermediate, or peak range), the mode to be used next can be determined. Preferably, a "worst case" approach is used, whereby the highest mode level detected will be used. (So, for example, if the number of active connections is measured, and it falls within the nominal range, but the effective bandwidth is also measured and it falls within the peak range, then the outcome of the mode determination will be "peak mode conditions".) In addition, repeated analysis of the thresholds may result in different mode determinations within a measurement interval as workload conditions fluctuate. The worst case of these determinations is used in preferred embodiments for setting the next mode, although other algorithms (such as weighted or smoothed samplings) may be used alternatively without deviating from the scope of the present invention. Due to the approach of preferred embodiments, the mode will remain constant for at least MINIMUM_MSEC_IN_MODE milliseconds. Counters are preferably reset after each measurement interval.

Finally, the PreExit plug-in preferably sets a pseudo-header on request messages which are processed during peak mode so that modified content (i.e. the cache variant) is served from cache, if available. Use of pseudo-header processing and its impacts on cache variants is known in the art, although its use during peak mode processing as disclosed herein is not known.

Figure 14:
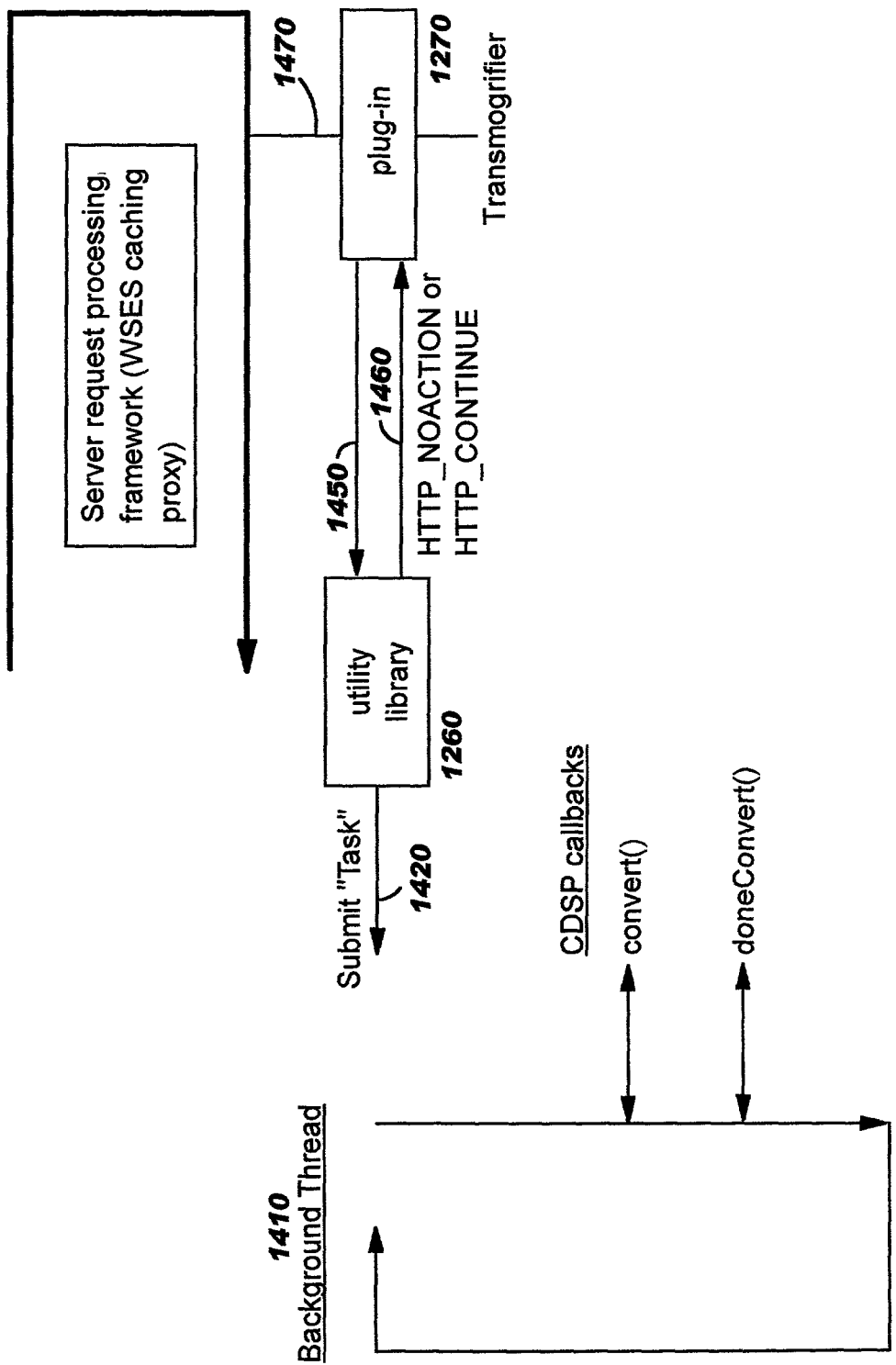

Referring now to FIG. 14, a representation of the components which perform content modifications is depicted. The content modification code may be invoked from the transmogrifier 1270 or from the callback functions from the background thread 1410. The diagram in FIG. 14 illustrates the processing flow within the embodiment of the present invention that has been shown in FIG. 5; it will be obvious to one of ordinary skill in the art how this processing is adapted for the scenario shown in FIG. 6.

As shown in FIG. 14, the transmogrifier plug-in 1270 is invoked first (see element 1470) by the request-processing framework. The transmogrifier's open( ) function calls 1450 an evaluateconditions( ) function of the utility library 1260, which determines whether the content should be modified, based on current conditions. If so, then either a task is submitted 1420 to the background thread 1410, or the transmogrifier 1270 is told (via return code; see element 1460) to modify content on-the-fly. (Refer to the discussion of the flowchart in FIG. 20 for information about which of these approaches will be taken in a given situation.) If the content should not be modified, according to the evaluateconditions( ) function, then the transmogrifier 1270 is told to notify the request-processing framework that it will not process the response (i.e. it will simply return the original, unmodified content).

The sample code in FIG. 15 shows how the Transmogrifier plug-in preferably implements a special pattern for the open( ) function, and invokes the evaluateconditions( ) function from the utility library. The return code "rc" specifies whether the Transmogrifier should process the response, where "HTTP_NOACTION" indicates that the unmodified content is to be returned and "HTTP_OK" indicates that modified content is to be returned.

A prototype showing one way in which the evaluateconditions( ) function may be implemented is provided in FIG. 16. In this example, the function pointers ("*convert" and "*doneConvert") refer to the two content modification callback functions which were previously discussed. These functions are passed a data structure "CallbackParms", which contains the content as well as the associated request and response headers. This provides the full context of the content. One way in which the CallbackParms data structure may be defined is shown in FIG. 17.

FIGS. 18 and 19 show simple examples of how the two callback functions might be implemented. FIG. 18 shows an example of the "convert" callback function that the background thread may call to perform a content modification. The variable "dataBuf" stores the original content, and the variable "modDataBuf" stores the content after it is modified. Note that in this example, the function simply returns a copy of the original content, whereas an actual implementation would perform some type of evaluation of the content to determine any modifications that should be performed. The "doneConvert" function in FIG. 19 is depicted as simply releasing memory in this example, although other types of processing might be included in an actual implementation if desired (for example, to perform any other type of "clean-up" operations that may be needed). According to preferred embodiments, this function is called by the background thread after it is finished with the modified contents contained in modDataBuf. (Note that this function is preferably always called after executing the convert function.) Preferably, the convert and doneconvert functions execute at the CDSP, so that the CDSP can retain responsibility for where modified content will be stored (i.e. what locations to specify on the replacement URLs) and so that the CDSP can manage its own memory.

Figure 20:
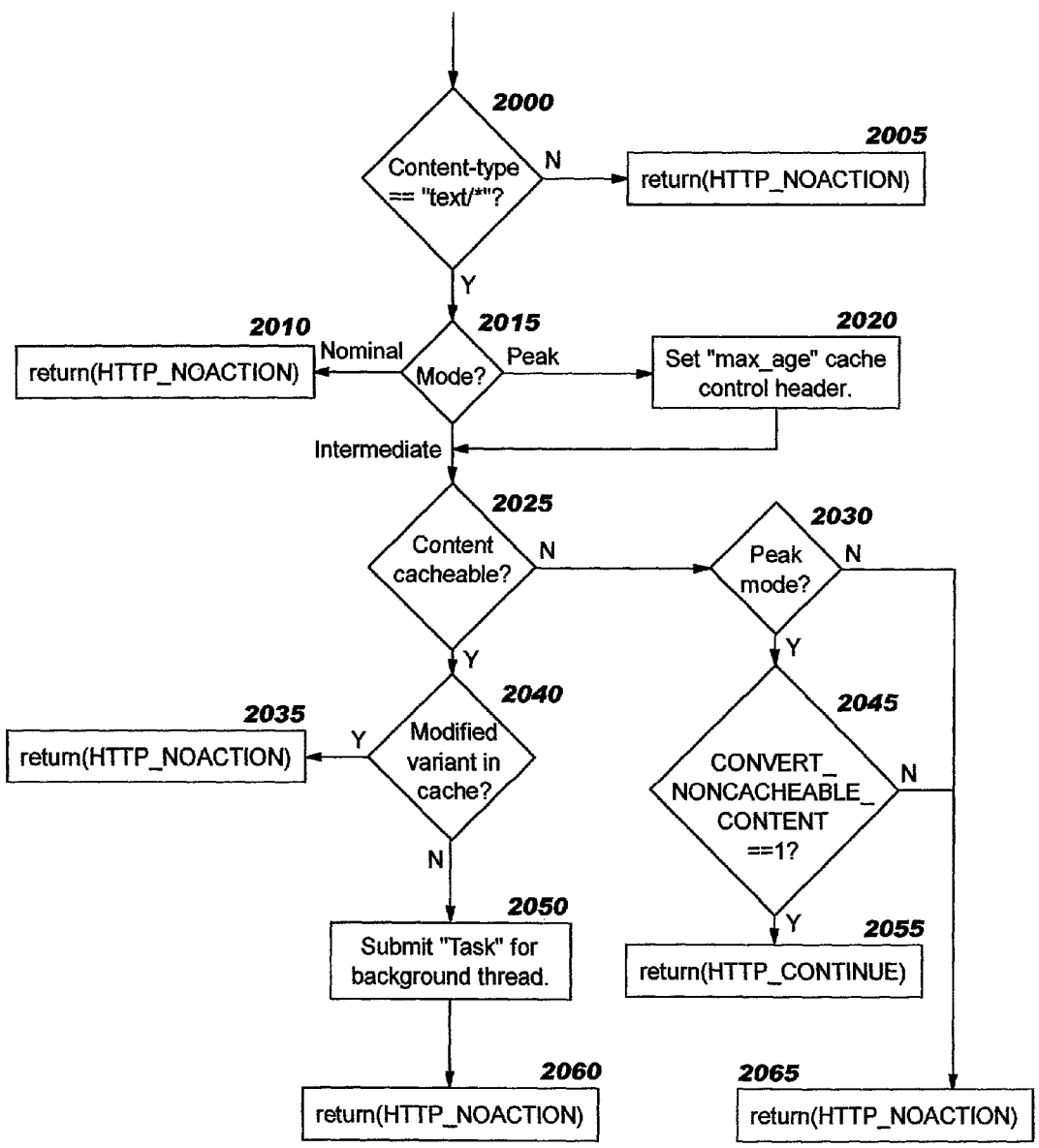
FIG. 20 provides a flowchart depicting logic that may be used when implementing preferred embodiments of the present invention.

The flowchart in FIG. 20 illustrates functioning that, according to preferred embodiments, is performed by the utility library in its "evaluateConditions( )" function. This function, which in preferred embodiments is invoked by the Transmogrifier plug-in, performs the following tasks:

(1) Determine whether the content should be modified. If so, the content is modified by either the background thread (by submitting a "Task", as discussed above) or on-the-fly by the Transmogrifier, as determined by the return code. A return code of HTTP_CONTINUE indicates that the Transmogrifier should process the response content; HTTP_NOACTION indicates no further processing.

(2) Set a maximum-age cache-control header if modified content is being served (i.e. the processing is occurring during peak mode).

The evaluation performed in FIG. 20 begins at Block 2000, which checks to see if the content type of the request is "text/*". If not, then a return code of HTTP_NOACTION is returned (Block 2005), and no further action is performed by FIG. 20. Otherwise, processing continues at Block 2015.

Block 2015 checks to see what the current operational mode is. If the system (e.g. a particular caching proxy) is currently in nominal mode, then Block 2010 returns a return code of HTTP_NOACTION, and no further action is performed by FIG. 20. If the system is currently in peak mode, then Block 2020 sets the max_age cache control header, in order to control the lifetime of the cached content (as was described above). After Block 2020, and when the system is in intermediate mode, control reaches Block 2025, which checks to see if this content is cacheable.

When the content is cacheable, processing continues at Block 2040, which checks to see if a modified variant of this content is already available in cache. If so, then no further action is required (i.e. it is not necessary to invoke the Transmogrifier's content modification processing), so HTTP_NOACTION is returned (Block 2035), and the processing of FIG. 20 ends. When the modified content is not yet cached, Block 2050 submits a task for the background thread, as has been described earlier, and Block 2060 returns the HTTP_NOACTION return code.

If the content is not cacheable, then control reaches Block 2030, which begins processing that determines whether an on-the-fly conversion (i.e. content modification) should be performed. Thus, Block 2030 checks to see if the system is currently operating in peak mode. If not, then no conversion will be performed, and control transfers to Block 2065 which returns the HTTP_NOACTION return code. If the system is in peak mode, however, then processing continues at Block 2045, which checks to see if the user has configured the system to perform content modifications under these circumstances. This is determined by evaluating the "CONVERT_CACHEABLE_CONTENT" variable. If the variable is set to TRUE, then Block 2055 returns a return code of "HTTP_CONTINUE", which will cause the Transmogrifier to invoke the convert function. (See FIGS. 15 and 18, above.) Otherwise, when the variable is set to FALSE, then control transfers to Block 2065 and the HTTP_NOACTION return code is used to suppress content modification.

In an optional aspect of the present invention that may be used for the deployment scenario in FIG. 5, a "pacing" approach may be used to determine when content modification should be performed. That is, even though the operational mode is currently set to "peak", it may happen that the workload dips below the peak threshold from time to time. In that case, the pacing approach allows using the enterprise's own internal resources to handle content requests. This maximizes utilization of the enterprise's resources and reduces the expense of serving content from the CDSP's resources. In this optional aspect, when the system is in peak mode, an additional check is performed when processing every request, where this additional check comprises evaluating the caching proxy's workload to see if it is below the peak threshold. If so, then the original (unmodified) content is served. Otherwise, modified content is served using the approach which has been described herein.

Figure 21:
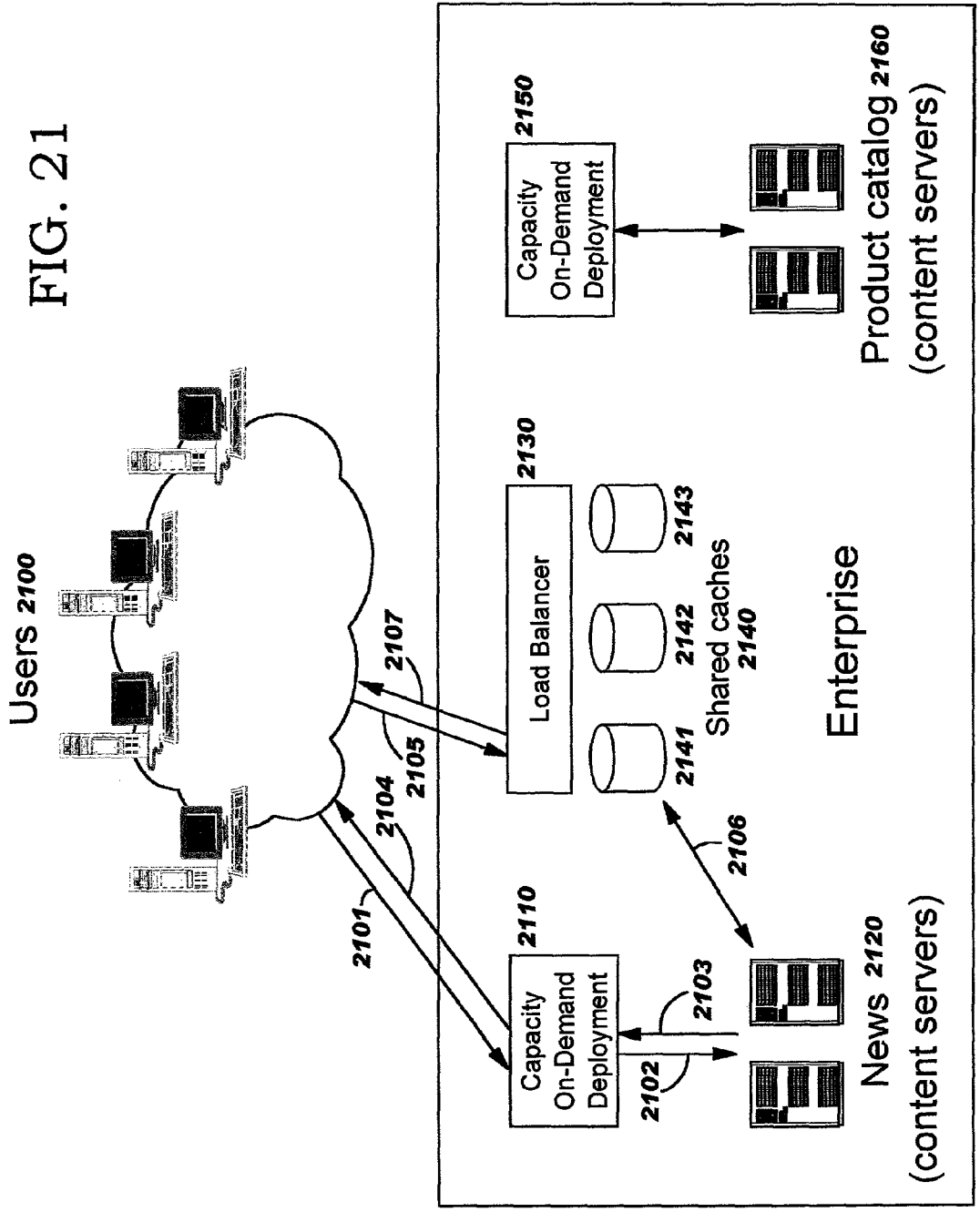
FIG. 21 depicts an embodiment of the present invention which provides capacity-on-demand using an enterprise's own resources.

FIG. 21 depicts an embodiment of the present invention which provides capacity-on-demand demand using an enterprise's own resources. Such resources might reside within an enterprise in the form of an enterprise-wide set of shared caches, for example, as shown in the figure. Suppose that the enterprise has a set 2130 of content servers devoted to serving news, and another set 2170 of content servers devoted to serving a product catalog, to the enterprise's users 2100. Further suppose that the teachings disclosed herein are used to implement capacity-on-demand deployment 2120, 2160 in the network path to these sets of servers. Then, rather than requiring the news 2130 and product catalog 2170 resources to be provisioned individually for their anticipated peak workloads (or, alternatively, to fail to support their peak workloads), each of these areas of the enterprise may provision locally to address their base (i.e. nominal) workload, and leverage the enterprise-wide shared resources (which have been shown, by way of example, as shared caches 2151, 2152, and 2153).

As an example, an embedded resource for the news users might be retrieved from URL "w3.ibm.com/images/logo.gif" during nominal and intermediate modes, whereas for peak mode retrievals, the reference is rewritten as "ibm-shared-cache/images/logo.gif". A particular user then issues a request 2101 for the content from the news servers 2130 that references this resource. The request is received at the implementation 2120 of the present invention (for example, a caching proxy), which retrieves 2102, 2103 the original content from servers 2130 and returns it 2104 to the user. If the content has been modified because of peak mode conditions, the request for the embedded resource is then automatically sent 2105 to a load balancer 2140 which is deployed to distribute workload among the shared caches 2150. Assume that the request reaches shared cache 2151, which does not yet have the resource loaded into its cache. A cache miss occurs (in the example), and the shared cache sends a request 2106 which retrieves the referenced content from an origin server in set 2130. Shared cache 2151 then returns 2107 the content to the requesting user. Upon receiving subsequent requests for that content, shared cache 2151 can quickly return the content to a user, without requiring the round trip 2106 to the content server.

The deployment shown in FIG. 21 results in an overall reduction in resources if the anticipated enterprise-wide peak workload is less than the sum of the individual peak workloads of the individual groups (i.e. in the example, the news and product catalog groups).

As has been demonstrated, the present invention defines an on-demand mechanism that provides an enterprise with better ROI on its eBusiness resources. Using the disclosed techniques, enterprises don't have to invest in expensive infrastructures that may be under-utilized during normal operating conditions, and instead can deploy resources to support a base level of demand and then rely on the present invention to dynamically (and temporarily) re-route traffic to external resources (or, in some embodiments, to shared internal resources) during peak demand conditions. This approach allows an enterprise to have a reduced barrier-to-entry for eBusiness, and to benefit from a CDSP's services at a lower cost than a traditional "always on" CDSP usage approach. CDSPs may charge a per-usage fee for this type of dynamic, temporary support. According to preferred embodiments, plug-in technology is leveraged to minimize the extent of system modifications required to support the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in that embodiment may occur to those skilled in the art once they learn of the basic inventive concepts. Therefore, it is intended that the appended claims shall be construed to include preferred embodiments as well as all such variations and modifications as fall within the spirit and scope of the invention.

What is claimed is:

1. A method of using dynamic capacity-on-demand techniques for re-routing traffic in a distributed computing network, comprising:
    comparing current workload conditions, at a system which receives a content request to determine which of a nominal mode, an intermediate mode, and a peak mode, the receiving system is operating within;
    serving an unmodified version of the requested content while in the nominal mode;
    generating a modified version of at least a portion of requested content while in the intermediate mode;
    continue serving an unmodified version of the requested content while in the intermediate mode; and
    serving the modified version while in the peak mode;
    wherein:
        the modified version is programmatically created from the unmodified version by rewriting selected ones of one or more embedded content references within the unmodified version; and
        the rewritten content references refer to resources which are external to an enterprise in which the receiving system is located, such that subsequent requests for each of the embedded content references are automatically directed to the external resources; and the embedded content references in the unmodified version refer to local resources of the enterprise, such that subsequent requests for each of the embedded content references are automatically directed to the local resources.

2. The method according to claim 1, wherein the programmatic creation of the modified version further comprises replacing one or more selected ones of the embedded content references within the unmodified version, such that the replaced content references no longer refer to local resources.

3. The method according to claim 1, wherein the receiving system is a caching proxy and the current workload conditions pertain to the caching proxy.

4. The method according to claim 1, wherein the receiving system is a load balancer and the current workload conditions pertain to one or more devices for which the load balancer balances workload.

5. The method according to claim 4, wherein one or more threshold values are specified as load balancing policy, and wherein one or more caching proxies are activated to perform the serving step when the modified versions of the requested content are to be served.

6. The method according to claim 1, wherein the peak mode reflects that current workload conditions exceed a peak mode threshold.

7. The method according to claim 6, wherein the intermediate mode reflects that current workload conditions exceed an intermediate mode threshold but not the peak mode threshold.

8. The method according to claim 6, wherein the serving the modified version while in the peak mode only occurs if the peak mode threshold is exceeded when the request for the content is received.

9. The method according to claim 1, further comprising caching the modified version as a cache variant of the unmodified version.

10. The method according to claim 1, further comprising:
    storing a copy of content referenced by the embedded content references on the external resources; and
    using the externally-stored copy to serve the subsequent requests.

11. The method according to claim 1, further comprising creating the modified version according to rules specifying which embedded content references are subject to modification and how those embedded content references should be modified.

12. The method according to claim 11, wherein the rules are specified using a structured markup language.

13. The method according to claim 1, wherein the resources are storage resources.

14. The method according to claim 1, wherein the resources are edgeable applications.

15. A method of using dynamic capacity-on-demand techniques for re-routing traffic in a distributed computing network, comprising:
    comparing current workload conditions, at a system which receives a content request to multiple threshold values to determine which of a nominal mode, an intermediate mode, and a peak mode, the receiving system is operating within by determining whether current workload conditions exceed an intermediate mode threshold, a peak mode threshold, or combinations thereof;

serving an unmodified version of the requested content while in the nominal mode;
generating a modified version of at least a portion of requested content while in the intermediate mode;
continue serving an unmodified version of the requested content while in the intermediate mode; and
serving the modified version while in the peak mode;
wherein:
the modified version is programmatically created from the unmodified version by rewriting selected ones of one or more embedded content references within the unmodified version; and
the rewritten content references refer to shared resources which are internal to an enterprise in which the receiving system is located, such that subsequent requests for each of the embedded content references are automatically directed to the shared internal resources; and the embedded content references in the unmodified version refer to dedicated resources of the system, such that subsequent requests for each of the embedded content references are automatically directed to the shared internal resources.

16. A method of hosting content for an enterprise, comprising:
providing storage resources for use by the enterprise;
receiving notification indicating which of a nominal mode, an intermediate mode, and a peak mode the enterprise is operating within after which the content hosting is desired, in which:
an unmodified version of the requested content is served while in the nominal mode;
a modified version of at least a portion of requested content is generated while in the intermediate mode;
an unmodified version of the requested content is still served while in the intermediate mode; and
the modified version is served while in the peak mode;
determining a local storage location on the provided storage resources for storing, at least temporarily, copies of each of one or more selected resources of the enterprise;
storing the copies of the one or more selected resources in the determined local storage locations;
programmatically modifying content of the third party in an intermediate mode to refer to selected ones of the determined local storage locations, such that subsequent requests for content references which are embedded in the programmatically modified content will be automatically diverted from the enterprise; and
serving the copies of particular ones of the one or more selected resources from the determined local storage resources when in the peak mode, responsive to receiving the subsequent diverted requests for the particular ones.

17. The method according to claim 16, further comprising charging the enterprise for use of the provided storage resources.

18. The method according to claim 16, further comprising charging the enterprise for serving the copies from the determined local storage resources.

19. The method according to claim 16, further comprising charging the enterprise for storing the copies of the one or more selected resources.

20. A method of providing resources for temporary use by one or more enterprises, comprising:
providing resources for use by a particular enterprise when resources internal to the enterprise are insufficient, as dynamically determined by whether the particular enterprise is operating in a nominal mode, an intermediate mode, or a peak mode, in which:
an unmodified version of the requested content is served while in the nominal mode;
a modified version of at least a portion of requested content is generated while in the intermediate mode;
an unmodified version of the requested content is still served while in the intermediate mode; and
the modified version is served while in the peak mode; and
processing requests for the provided resources upon demand of the particular enterprise
wherein:
the modified version is programmatically created from the unmodified version by rewriting selected ones of one or more embedded content references within the unmodified version; and
the rewritten content references refer to resources which are external to an enterprise in which the receiving system is located, such that subsequent requests for each of the embedded content references are automatically directed to the external resources; and the embedded content references in the unmodified version refer to local resources of the enterprise, such that subsequent requests for each of the embedded content references are automatically directed to the local resources.

21. The method according to claim 20, further comprising charging the particular enterprise for the processing.

22. The method according to claim 20, wherein the resources are storage resources.

23. The method according to claim 20, wherein the resources are application resources.

24. A system for using dynamic capacity-on-demand techniques for re-routing traffic in a distributed computing network, comprising:
a processor; and
computer-readable memory coupled to the processor, the memory comprising instructions executable by the processor to:
determine which of a nominal mode, an intermediate mode, and a peak mode a receiving system is operating within;
determine which portion of requested content is modifiable content;
serve an unmodified version of the requested content while in the nominal mode;
generate a modified version of at least a portion of requested content while in the intermediate mode by modifying the modifiable content;
continue to serve an unmodified version of the requested content while in the intermediate mode; and
serve the modified version while in the peak mode;
wherein:
the modified version is programmatically created from the unmodified version by rewriting selected ones of one or more embedded content references within the unmodified version; and
the rewritten content references refer to storage resources which are external to an enterprise in which the receiving system is located, such that subsequent requests for each of the embedded content references are automatically directed to the external storage resources; and the embedded content references in the unmodified version refer to local storage resources of the enterprise, such that subsequent requests for each of the embedded content references are automatically directed to the local storage resources.

25. The system according to claim 24, wherein the programmatic creation of the modified version further comprises replacing one or more selected ones of the embedded content references within the unmodified version, wherein that the replaced content references no longer refer to storage resources.

26. The system according to claim 24, wherein the receiving system is a caching proxy and the current workload conditions pertain to the caching proxy.

27. The system according to claim 24, wherein the receiving system is a load balancer and the current workload conditions pertain to one or more devices for which the load balancer balances workload.

28. The system according to claim 27, wherein one or more threshold values are specified as load balancing policy, and wherein one or more caching proxies are activated to serve the modified version when the modified versions of the requested content are to be served.

29. The system according to claim 24, wherein the peak mode reflects that the current workload conditions exceed a peak mode threshold.

30. The system according to claim 29, wherein the intermediate mode reflects that current workload conditions exceed an intermediate mode threshold but not the peak mode threshold.

31. The system according to claim 29, wherein serving the modified version while in the peak mode serves the modified version only if the peak mode threshold is exceeded when the request for the content is received.

32. The system according to claim 24, further comprising instructions, executable by the processor to cache the modified version as a cache variant of the unmodified version.

33. The system according to claim 24, further comprising instructions executable by the processor to:
    store a copy of content referenced by the embedded content references on the external storage resources; and
    use the externally-stored copy to serve the subsequent requests.

34. The system according to claim 24, further comprising instructions, executable by the process to create the modified version according to rules specifying which embedded content references are subject to modification and how those embedded content references should be modified.

35. A computer program product for using dynamic capacity-on-demand techniques for re-routing traffic in a distributed computing network, the computer program product comprising one or more non-transitory computer-readable storage media and comprising:
    computer-readable program code configured to compare current workload conditions, at a system which receives a content request, to multiple threshold values to determine which of a nominal mode, an intermediate mode, and a peak mode, the receiving system is operating within by determining whether current workload conditions exceed an intermediate mode threshold, a peak mode threshold, or combinations thereof;
    computer-readable program code configured to determine which portion of requested content is modifiable content;
    computer-readable program code configured to serve an unmodified version of the requested content while in the nominal mode;
    computer-readable program code configured to generate a modified version of at least a portion of the requested content while in an intermediate mode by modifying the modifiable content;
    computer-readable program code configured to continue to serve an unmodified version of at least of the requested content while in the intermediate mode; and
    computer-readable program code configured to serve a modified version of the requested modifiable content while in the peak mode;
    computer-readable program code configured to determine whether a receiving system has exited a peak mode by comparing the current workload conditions to an exit peak mode threshold, in which the exit peak mode threshold is different from the peak mode threshold;
    wherein:
        the modified version is programmatically created from the unmodified version by rewriting selected ones of one or more embedded content references within the unmodified version; and
        the rewritten content references refer to storage resources which are external to an enterprise in which the receiving system is located, such that subsequent requests for each of the embedded content references are automatically directed to the external storage resources; and the embedded content references in the unmodified version refer to local storage resources of the enterprise, such that subsequent requests for each of the embedded content references are automatically directed to the local storage resources.

36. The computer program product according to claim 35, wherein the programmatic creation of the modified version further comprises replacing one or more selected ones of the embedded content references within the unmodified version, wherein that the replaced content references no longer refer to storage resources.

37. The computer program product according to claim 35, wherein the receiving system is a caching proxy and the current workload conditions pertain to the caching proxy.

38. The computer program product according to claim 35, wherein the receiving system is a load balancer and the current workload conditions pertain to one or more devices for which the load balancer balances workload.

39. The computer program product according to claim 38, wherein one or more threshold values are specified as load balancing policy, and wherein one or more caching proxies are activated to perform the computer-readable program code configured to serve a modified version of the requested content, or an unmodified version of the requested content, depending on the current operational mode when the modified versions of the requested content are to be served.

40. The computer program product according to claim 35, wherein the peak mode reflects that current workload conditions exceed a peak mode threshold.

41. The computer program product according to claim 40, wherein the intermediate mode reflects that current workload conditions exceed an intermediate mode threshold but not the peak mode threshold.

42. The computer program product according to claim 41, further comprising computer-readable program code configured to send corresponding requests to a provider of the external resources to cause the provider to retrieve a copy of content referenced by the embedded content references in response to receiving content requests when the current operating mode is the intermediate mode.

43. The computer program product according to claim 40, wherein the computer-readable program code configured to serve the modified version while in the peak mode only occurs if the peak mode threshold is exceeded when the request for the content is received.

44. The computer program product according to claim 35, further comprising computer-readable program code configured to cache the modified version as a cache variant of the unmodified version.

45. The computer program product according to claim 35, further comprising:
- computer-readable program code configured to store a copy of content referenced by the embedded content references on the external storage resources; and
- computer-readable program code configured to use the externally-stored copy to serve the subsequent requests.

46. The computer program product according to claim 35, further comprising computer-readable program code configured to create the modified version according to rules specifying which embedded content references are subject to modification and how those embedded content references should be modified.

* * * * *